United States Patent
Kim et al.

(10) Patent No.: US 11,875,055 B2
(45) Date of Patent: *Jan. 16, 2024

(54) STORAGE DEVICE THAT RECEIVES INODE ADDRESS INFORMATION TO REDUCE EXTERNAL COMMUNICATION OVERHEAD

(71) Applicant: SAMSUNG ELECTRONICS CO., LTD., Suwon-si (KR)

(72) Inventors: Junghoon Kim, Yongin-si (KR); Seonghun Kim, Suwon-si (KR); Hongkug Kim, Yongin-si (KR); Sojeong Park, Suwon-si (KR)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/897,534

(22) Filed: Aug. 29, 2022

(65) Prior Publication Data

US 2022/0413754 A1 Dec. 29, 2022

Related U.S. Application Data

(63) Continuation of application No. 16/896,934, filed on Jun. 9, 2020, now Pat. No. 11,461,041.

(30) Foreign Application Priority Data

Dec. 2, 2019 (KR) .................... 10-2019-0158001

(51) Int. Cl.
G06F 3/06 (2006.01)
(52) U.S. Cl.
CPC ............ *G06F 3/0656* (2013.01); *G06F 3/064* (2013.01); *G06F 3/0611* (2013.01); *G06F 3/0622* (2013.01); *G06F 3/0629* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,044,205 A | 3/2000 | Reed et al. | |
| 8,290,996 B2 | 10/2012 | Engelsiepen et al. | |
| 8,402,202 B2 | 3/2013 | Park et al. | |
| 9,798,761 B2 | 10/2017 | Shin et al. | |
| 9,971,799 B2 | 5/2018 | Kim et al. | |

(Continued)

FOREIGN PATENT DOCUMENTS

KR 1430762 B1 8/2014

*Primary Examiner* — Edward J Dudek, Jr.
*Assistant Examiner* — Ralph A Verderamo, III
(74) *Attorney, Agent, or Firm* — Fish & Richardson P.C.

(57) ABSTRACT

A storage device includes: a nonvolatile storage including a first region and a second region, a storage controller controlling operation of the nonvolatile storage, and a buffer memory connected to the storage controller. The storage controller stores user data received from a host device in the second region, stores metadata associated with management of the user data and generated by a file system of the host device in the first region, loads the metadata from the first region to the buffer memory in response to address information for an index node (inode) associated with the metadata, and accesses the target data in the second region using the metadata loaded to the buffer memory.

18 Claims, 22 Drawing Sheets

(56) References Cited

U.S. PATENT DOCUMENTS

| | | |
|---|---|---|
| 10,019,451 B2 | 7/2018 | Preslan |
| 10,303,395 B2 | 5/2019 | Minamiura et al. |
| 10,552,058 B1 * | 2/2020 | Jadon .................. G06F 3/0647 |
| 10,783,120 B1 * | 9/2020 | Brown .................. G06F 3/065 |
| 2006/0047865 A1 | 3/2006 | Ellis et al. |
| 2010/0211750 A1 * | 8/2010 | Yamauchi ........... G06F 12/1009 |
| | | 711/E12.001 |
| 2011/0022819 A1 * | 1/2011 | Post .................... G06F 12/1009 |
| | | 711/E12.001 |
| 2012/0209893 A1 * | 8/2012 | Kim ...................... G06F 16/17 |
| | | 707/822 |
| 2013/0250677 A1 * | 9/2013 | Nam .................... G11C 16/10 |
| | | 365/185.03 |
| 2014/0215129 A1 * | 7/2014 | Kuzmin ............. G06F 12/0246 |
| | | 711/103 |
| 2014/0337560 A1 | 11/2014 | Chun et al. |
| 2015/0324284 A1 | 11/2015 | Kim et al. |
| 2016/0203203 A1 | 7/2016 | Lord |
| 2016/0253093 A1 | 9/2016 | Zhang |
| 2016/0274794 A1 | 9/2016 | Yoon |
| 2018/0173438 A1 | 6/2018 | Li |
| 2019/0034427 A1 | 1/2019 | Trika et al. |
| 2019/0138445 A1 | 5/2019 | Lee et al. |
| 2019/0235779 A1 | 8/2019 | Li |
| 2020/0151108 A1 | 5/2020 | Yen et al. |
| 2020/0201784 A1 | 6/2020 | Palmer |
| 2020/0242021 A1 | 7/2020 | Gholamipour et al. |
| 2020/0301847 A1 | 9/2020 | Miura |
| 2021/0141561 A1 | 5/2021 | Kale et al. |
| 2021/0224232 A1 * | 7/2021 | Dalmatov ............. G06F 16/185 |
| 2021/0240608 A1 * | 8/2021 | Jean .................... G06F 12/0292 |

* cited by examiner

| NODE ID | PHYSICAL ADDRESS |
|---------|------------------|
| ND1 | a |
| ND2 | b |
| ND3 | c |
| ⋮ | |

MTa

| LPN | PPN |
|---|---|
| LPN0 | PPN0 |
| LPN1 | PPN2 |
| LPN2 | PPN4 |
| LPN3 | PPN6 |

MTb

| LPN | PPN |
|---|---|
| LPN0 | PPN40 |
| LPN1 | PPN41 |
| LPN2 | PPN42 |
| LPN3 | PPN43 |

| HOT | COLD |
|---|---|
| LPN5 | LPN11 |
| LPN6 | LPN12 |
| LPN7 | LPN13 |
| LPN8 | LPN14 |

STORAGE DEVICE THAT RECEIVES INODE ADDRESS INFORMATION TO REDUCE EXTERNAL COMMUNICATION OVERHEAD

CROSS-REFERENCE TO RELATED APPLICATION

This is a Continuation of U.S. application Ser. No. 16/896,934, filed Jun. 9, 2020, which claims the benefit of Korean Patent Application No. 10-2019-0158001 filed on Dec. 2, 2019 in the Korean Intellectual Property Office, the subject matter of which is hereby incorporated by reference.

BACKGROUND

Example embodiments relate generally to data processing, and more particularly to a storage device, a storage system including a storage device, and/or methods of operating a storage device.

Computing devices may take many forms including a desktop computer, a notebook computer, a smart phone, a smart tablet, etc. A hard disk driver (HDD) has traditionally been used as a storage device in many computing devices. However, mobile devices such as smart phones use a nonvolatile memory device as a storage device instead of the HDD. Nonvolatile memory devices include (e.g.) NAND flash memory, phase-change RAM (PRAM), magnetic RAM (MRAM), resistive RAM (RRAM), and ferroelectric RAM (FRAM).

The frequency with which storage devices are accessed by contemporary computing devices is increasing. Such increasing frequency of use stresses the storages devices.

Nonvolatile memory devices have a comparatively short history of use, as compared with the HDD. As a result, most of file systems currently used to manage a storage device are designed to fit the operating characteristics of the HDD. Due to differences in the operating characteristics of a nonvolatile memory device as compared with the HDD, existing file systems cannot make full and efficient use of the performance capabilities offered by the nonvolatile memory device. Accordingly, new approaches to file systems, data transfer and storage, as well as storage devices including nonvolatile memory devices should be carefully considered in order to full realize the performance advantages offered by nonvolatile memory device.

SUMMARY

Some example embodiments provide a storage device capable of reducing input/output (I/O) overhead between the storage device and a host device.

Some example embodiments provide a storage system capable of reducing I/O overhead between the storage device and a host device.

Some example embodiments provide a method of operating a storage device, capable of reducing I/O overhead between the storage device and a host device.

According to some example embodiments, a storage device includes a storage device including; a nonvolatile storage including a first region and a second region, a storage controller configured to control the nonvolatile storage, and a buffer memory connected to the storage controller, wherein the storage controller is configured to store user data including target data received from a host device in the second region, and store metadata associated with management of the user data and generated by a file system of the host device in the first region, and the storage controller is further configured to load the metadata to the buffer memory in response to address information for an index node (inode) associated with the metadata, and access the target data in the second region using the metadata loaded to the buffer memory.

According to some example embodiments, a storage system includes; a host device including a file system and providing user data including target data, and metadata associated with management of the user data and generated by the file system, and a storage device including; a nonvolatile storage including a first region and a second region, a storage controller configured to control operation of the nonvolatile storage, and a buffer memory connected to the storage controller, wherein the storage controller is configured to store the user data in the second region, and store the metadata in the first region, and the storage controller is further configured to load the metadata to the buffer memory in response to address information for an index node (inode) associated with the metadata, and access the target data in the second region using the metadata loaded to the buffer memory.

According to some example embodiments, a method of operating a storage device including a nonvolatile storage including a first region and a second region, a storage controller controlling operation of the nonvolatile storage, and a buffer memory connected to the storage controller includes; storing user data received from a host device in the second region, storing metadata associated with management of the user data and generated by a file system of the host device in the first region, loading the metadata from the first region to the buffer memory in response to address information for an index node (inode) associated with the metadata, and accessing the target data in the second region using the metadata loaded to the buffer memory.

BRIEF DESCRIPTION OF THE DRAWINGS

Illustrative, non-limiting example embodiments will be more clearly understood from the following detailed description in conjunction with the accompanying drawings.

DETAILED DESCRIPTION

Various example embodiments will be described more fully hereinafter with reference to the accompanying drawings, in which some example embodiments are shown.

As illustrated below, each of the component blocks may be implemented in hardware, e.g. in hardware configured to execute non-transient instructions. For example, unless otherwise specified, components such as controllers such as storage controllers, etc. may be implemented as a circuit, an FPGA, and/or a processor that is configured to execute machine readable instructions such that, when executed by the processor, cause the processor to perform the specific functions.

Figure 1:
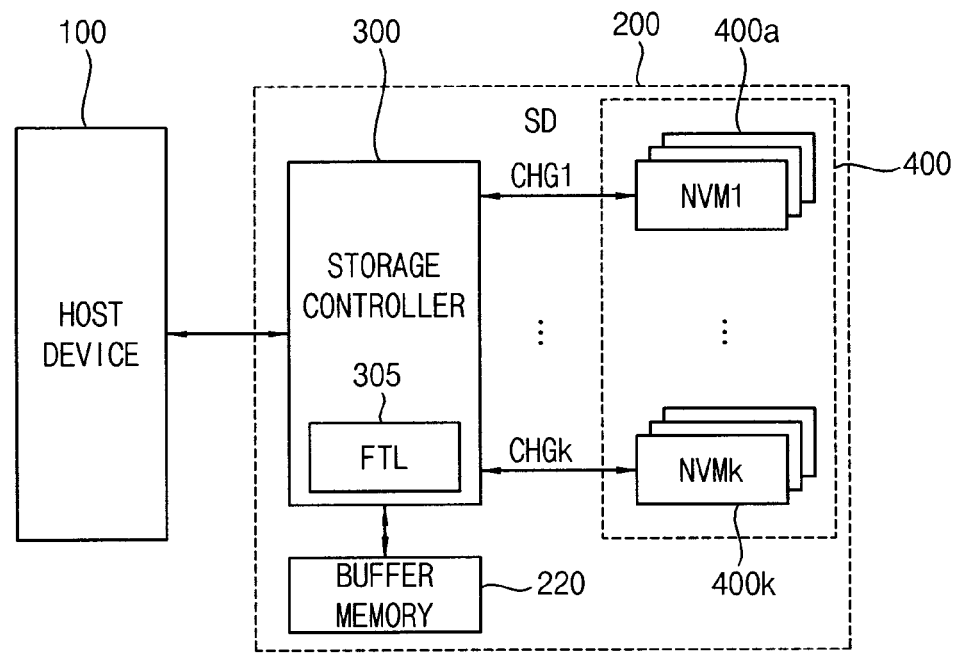
FIG. 1 is a block diagram illustrating a storage system (or, a data storage system) according to some example embodiments.

FIG. 1 is a block diagram illustrating a data storage system (hereafter, storage system) according to some example embodiments.

Referring to FIG. 1, a storage system 10 includes a host device 100 and a storage device (SD) 200. The storage device 200 may include a solid state drive (disk) (SSD).

The host device 100 may control overall operation of the storage device 200. The host device 100 may exchange various command, control, address and/or data signals with storage device 200.

The storage device 200 may include a storage controller 300 and a nonvolatile storage 400, and the nonvolatile storage 400 may include a plurality of nonvolatile storages 400a~400k, where 'k' is a natural number greater than 2. Each of the nonvolatile storages 400a~400k may include NAND flash memories.

The storage controller 300 may control the exchange of command, address and/or data signals with the host device 100. The storage controller 300 may write (or program) data in a nonvolatile storage, and/or may read data from a nonvolatile storage in response to one or more commands (e.g., request(s)) received from the host device 100.

The storage controller 200 may include a flash translation layer (FTL) 305.

The FTL 305 may be firmware or software driven by the storage controller 300. The FTL 305 may translate a logical address of a storage space managed by the host device 100 into a physical address of a storage space of the nonvolatile storage 400. The storage controller 300 may translate a logical address of a logical address-based request received from the host device 100 into a physical address using the FTL 305. The FTL 305 may manage the nonvolatile storage 400 and perform various background operations for improving operation performance of the nonvolatile storage 400.

The storage system 10 of FIG. 1 operates in relation to at least two types of data generally referred to as user data and metadata. User data is content related or payload data provided by the host device 100 to the storage device 200, and written to the nonvolatile storage 400. The user data may include various data such as data associated with an operating system and/or application(s) installed in the storage system 10 (e.g., a word processing file, a spreadsheet file, an audio file, a video file, a multimedia file, and a compressed data file, etc.). In contrast, metadata (or the metadata set) is data which the host device 100 generates and uses to manage the operation of the storage device 200. The metadata may include file system data defined by the storage device 100. The metadata may also be provided by the host device 100 to the storage device 200, and may be written to the nonvolatile storage 400 or a file system without user intervention so that it may be retained in memory in the absence of applied power.

The storage device 200 may further include a buffer memory 220 connected to the storage controller 300.

The buffer memory 220 may be used as a buffer area to temporarily storing write data received from the host device 100 and/or read data retrieved from the nonvolatile memory devices 400a~400k.

The buffer memory 220 may also be used to store and/or drive software used to manage the operation of the nonvolatile memory devices 400a~400k. The buffer memory 220 may be used to store metadata received from the host device 100 and/or may be used to store cache data. In some embodiments, the buffer memory 220 may include a volatile memory such as a dynamic random access memory (DRAM) or static random access memory (SRAM) device.

The plurality of nonvolatile memory devices 400a~400k may be used as the primary storage media of the storage device 200. The nonvolatile memory devices 400a~400k may be connected to the storage controller 300 via a plurality of channel groups CHG1~CHGk. Each of the channel groups CHG1~CHGk may include at least one channel One or more nonvolatile memory devices may be connected to each channel group. Nonvolatile memory devices connected to one channel group may be connected via a common data bus.

Although not illustrated, the storage device 200 may further include a pad to be connected to the host device 100. The storage device 200 can be attached and/or detached host device 100 using the pad. The pad may be formed integral to the storage device 200 or as an external connector attached to the storage device 200. In some example embodiments, the storage device 200 may not include a pad, but instead may be connected to the host device 100 via an electronic routing process.

Figure 2:
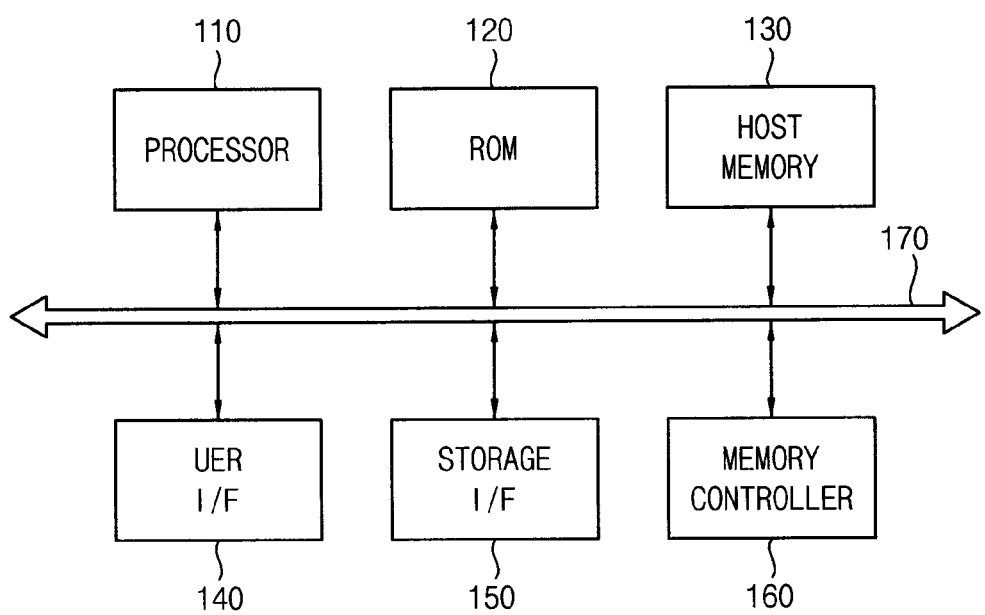
FIG. 2 is a block diagram illustrating the host device in FIG. 1 according to some example embodiments.

FIG. 2 is a block diagram further illustrating the host device 100 of FIG. 1 according to some example embodiments.

Referring to FIG. 2, the host device 100 may include a processor 110, a read-only memory (ROM) 120, a host memory 130, a user interface 140, a storage interface 150, and/or a bus 170. The host device 100 may further include a memory controller 160.

The bus 170 may refer to a transmission channel via which data is transmitted between the processor 110, the ROM 120, the host memory 130, the user interface 140, the storage interface 150, and/or the memory controller 160 of the host device 100.

The processor 110 may control overall operations of the host device 100. The processor 110 may execute software loaded onto the host memory 120. For example, the processor 110 may execute an application program, a file system, a block I/O scheduler, and a device driver. The processor 110 may include homogeneous multi-core processors or heterogeneous multi-core processors. For example, the processor 110 may include at least one of a central processing unit (CPU), an image signal processing unit (ISP), a digital signal processing unit (DSP), a graphics processing unit (GPU), a vision processing unit (VPU), and a neural processing unit (NPU).

The ROM 120 may store various application programs, for example, application programs supporting storage protocols such as Advanced Technology Attachment (ATA), Small Computer System Interface (SCSI), embedded Multi Media Card (eMMC), and Universal Flash storage (UFS) protocols and NVMe.

The host memory 130 may temporarily store data or programs. An operating system (OS) which manages all hardware and software in the storage system 10 may be loaded onto the host memory 130.

The storage interface 150 may include interfaces supporting storage protocols such as SATA, SAS, eMMC, UFS, and/or NVMe.

The user interface 140 may be or include a physical or virtual medium for exchanging information between a user and the host device 100, a computer program, etc., and may include physical hardware and logical software. For example, the user interface 140 may include an input device allowing a user to interface with the host device 100, and/or an output device providing a data processing result to the user.

The memory controller 160 may control the host memory 130.

Figure 3:
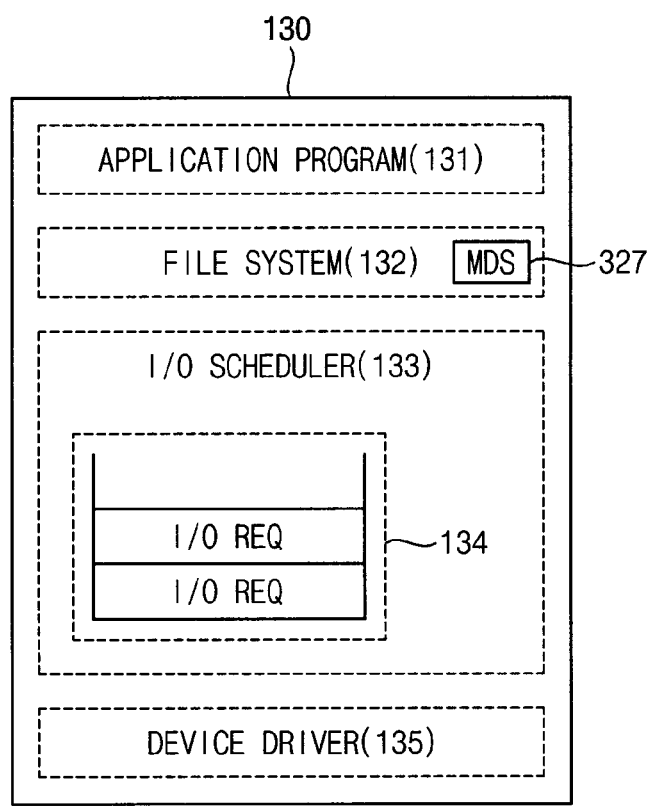
FIG. 3 illustrates an example of the host memory in FIG. 2 according to example embodiments.

FIG. 3 is a conceptual diagram illustrating various components of the host memory 130 of FIG. 2 according to example embodiments.

Referring to FIG. 3, the host memory may load (e.g.) an application program 131 in a user space, a file system 132 included in a kernel space, a I/O scheduler 133, and a device driver 325.

The software layers (e.g.) 131, 132, 133 and 135 loaded to the host memory 130 may be included in a software stack used to access the storage device 200. The host memory 130 may include storage medium such as for example a DRAM device or an SRAM device.

The application program 131 may be executed as a basic (or default) service or in responsive to a user request. The user space where the application program 131 is stored and the kernel space where a kernel including the file system 132, the I/O scheduler 133, the device driver 135, etc. are stored may be separately designated. The application program 131 cannot directly access a resource such as the storage device 200. Instead, the application program 131 may call one or more function(s) defined in a library (not illustrated) in which system call functions are included, and may request a task from the kernel. In the case where the system call function is used, a switch from a user mode to a kernel mode may be made.

The file system 132 may manage files or data stored to the storage device 200. For example, the file system 132 may include a file allocation table (FAT), an new technology file system (NTFS), an hierarchical file system (HFS), an high performance file system (HPFS), an unix file system UFS), a secondary extended file system (ext2), an ext3, an ext4, a journaling file system (JFS), an ISO 9660, Files-11, a veritas file system (VxFS), a ZFS, a ReiserFS, a universal disk format (UDF), or the like. In particular, the file system 132 may perform journaling that preserves consistency of data across the host memory 130 (e.g., file and/or data consistency) during a sudden power off (SPO) event or system crash.

The file system 132 may be used to generate metadata (MDS) 327 that manages the storing and/or retrieving of user data in the nonvolatile storage 400. The file system 132 may store the MDS 327 in the host memory 130.

The I/O scheduler 133 may be present in a block layer. The I/O scheduler 133 may receive various I/O requests from the file system 132 and may store the received I/O requests to a scheduler queue 134. The I/O scheduler 133 may manage the scheduler queue 134. The block scheduler 133 may merge the I/O requests or may adjust the order of the I/O requests (re-ordering).

The device driver 135 is a program which operates as a part of the kernel for controlling a hardware device such as the storage device 200. The device driver 135 may remove I/O requests from the scheduler queue 134 and may generate a command for controlling the storage device 200. The device driver 135 may process the I/O requests of the scheduler queue 134. For example, the device driver 135 may be a block device which performs data input and/or output functions in relation to the storage device 200 on a block basis. In other embodiments, other program(s) and/or software layer(s) may be loaded to the host memory 130 beyond those illustrated in FIG. 3.

Figure 4:
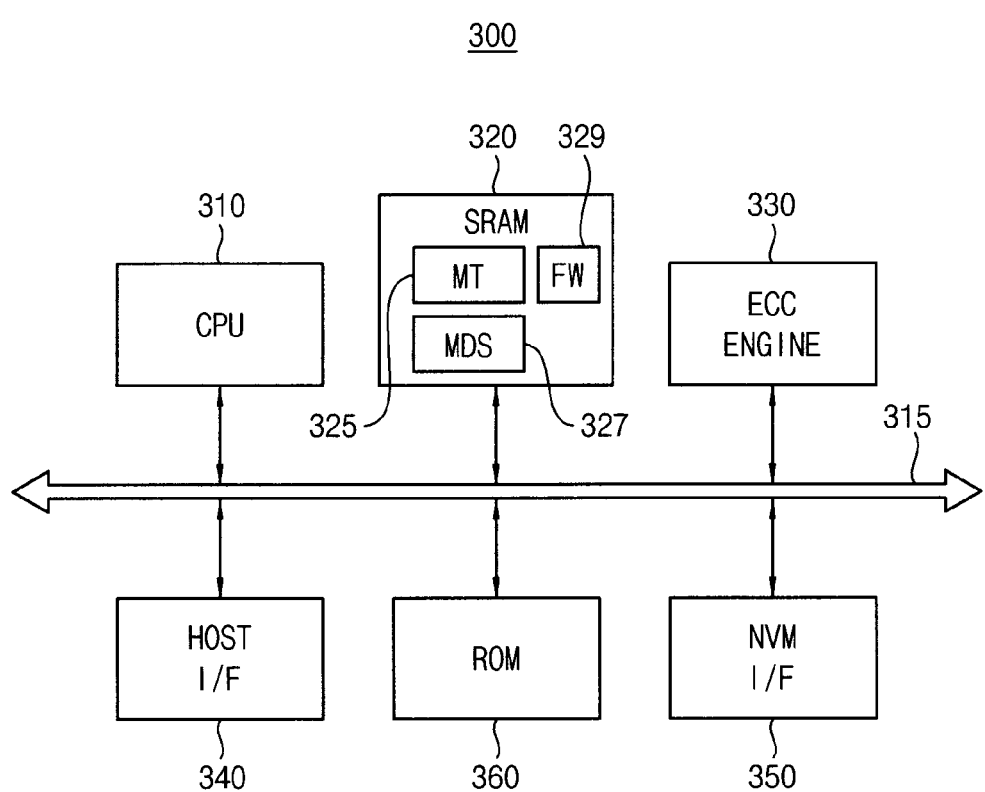
FIG. 4 is a block diagram illustrating the storage controller in FIG. 1 according to some example embodiments.

FIG. 4 is a block diagram further illustrating the storage controller 300 of FIG. 1 according to some example embodiments.

Referring to FIG. 4, the storage controller 300 may include a processor 310 such as a CPU, an SRAM 320, an error correction code (ECC) engine 330, a host interface 340, a ROM 360, a nonvolatile memory interface 350, and/or a bus 315.

The bus 315 may refer to a transmission channel through which data is exchanged with the processor 310, the SRAM 320, the ECC engine 330, the host interface 340, the migration manager 360, and the nonvolatile memory interface 350 of the storage controller 300. The processor 310 may perform operation for data exchange between the host device 100 and the nonvolatile memory devices 400a~400k.

The host interface 340 is connected to the host device 100 and the nonvolatile memory interface 350 is connected to the nonvolatile memory devices 400a~400k. The processor 310 may communicate with the host device 100 via the host interface 340. The host interface 340 may be implemented using, but not limited to, a SATA interface, a Parallel Advanced Technology Attachment (PATA) interface, USB or SAS interface, an eMMC interface, a UFS interface, and/or an eMMC interface.

The processor 310 may communicate with the nonvolatile memory devices 400a~400k through nonvolatile memory interface 350. The nonvolatile memory interface 350 may be connected to each of the nonvolatile memory devices 400a~400k.

The ECC engine 330 may generate an error correction code (ECC) for write data received from the host device 100 using various engines during a write operation. During a read operation, the ECC engine 330 may perform error detection and error correction on read data retrieved from the nonvolatile memory devices 400a~400k to provide (or return) the data to the host device 100.

The SRAM 320 may store the metadata 327, a mapping table 325 and a firmware 329. The mapping table 325 may store mapping information correlating logical addresses received from the host device 100 with physical addresses used to designate memory locations in the nonvolatile memory devices 400a~400k.

The processor 310 may control access to the nonvolatile memory devices 400a~400k by combining the metadata set 327 and the firmware 329. The ROM 360 may store information for operating the storage controller 300 as firmware.

Figure 5:
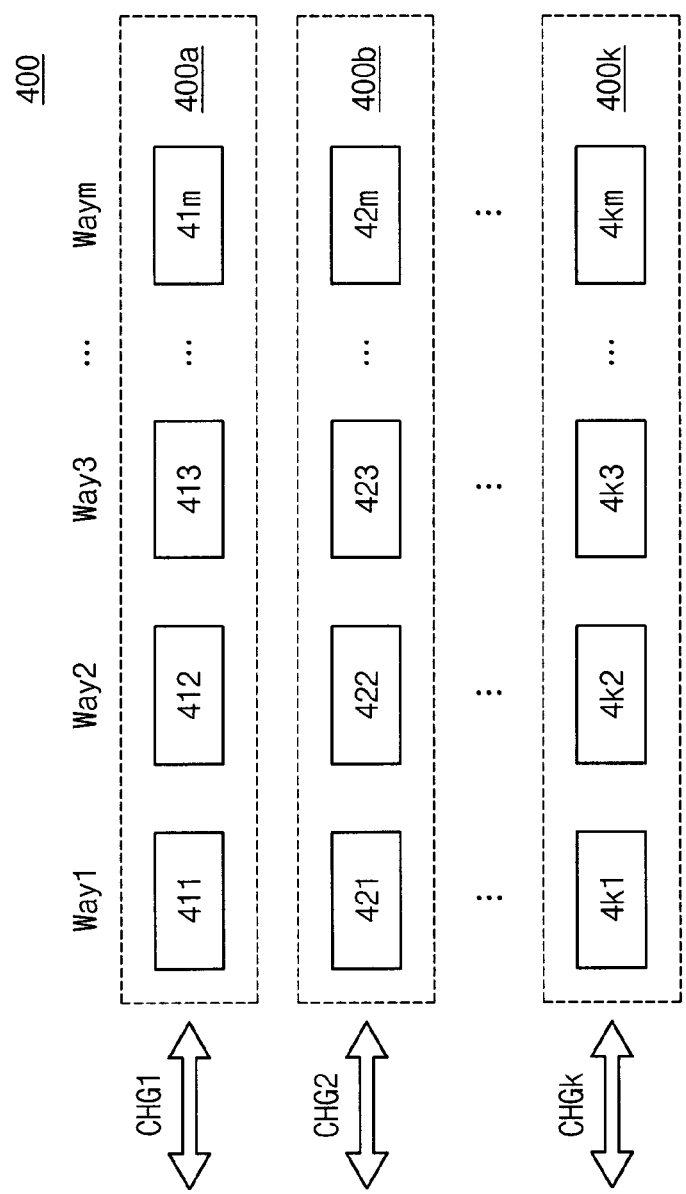
FIG. 5 illustrates an example of a plurality of channels and ways of the nonvolatile storage in FIG. 1 according to some example embodiments.

FIG. 5 is a conceptual diagram illustrating one possible arrangement of channels and ways that might be used to access the nonvolatile storage 400 of FIG. 1 according to some example embodiments.

Referring to FIGS. 1 and 5, the nonvolatile memory devices 400a~400k may be variously connected to one of the channel groups CHG1~CHGk. For example, nonvolatile memory devices 411~41m, 421~42m, ..., 4k1~4km may be variously connected to one of the channel groups CHG1~CHGk to form ways; namely, way1~waym, where 'm' is a natural number greater than 2. That is, respective 'm' nonvolatile memory devices 411~41m, 421~42m, ..., 4k1~4km may be included in 'm' ways in each of the channel groups CHG1~CHGk.

Here, a way denotes a unit dividing nonvolatile memory devices sharing the same channel. Accordingly, each of the nonvolatile memory devices may be specifically identified according to a channel number and a way number.

Figure 6:
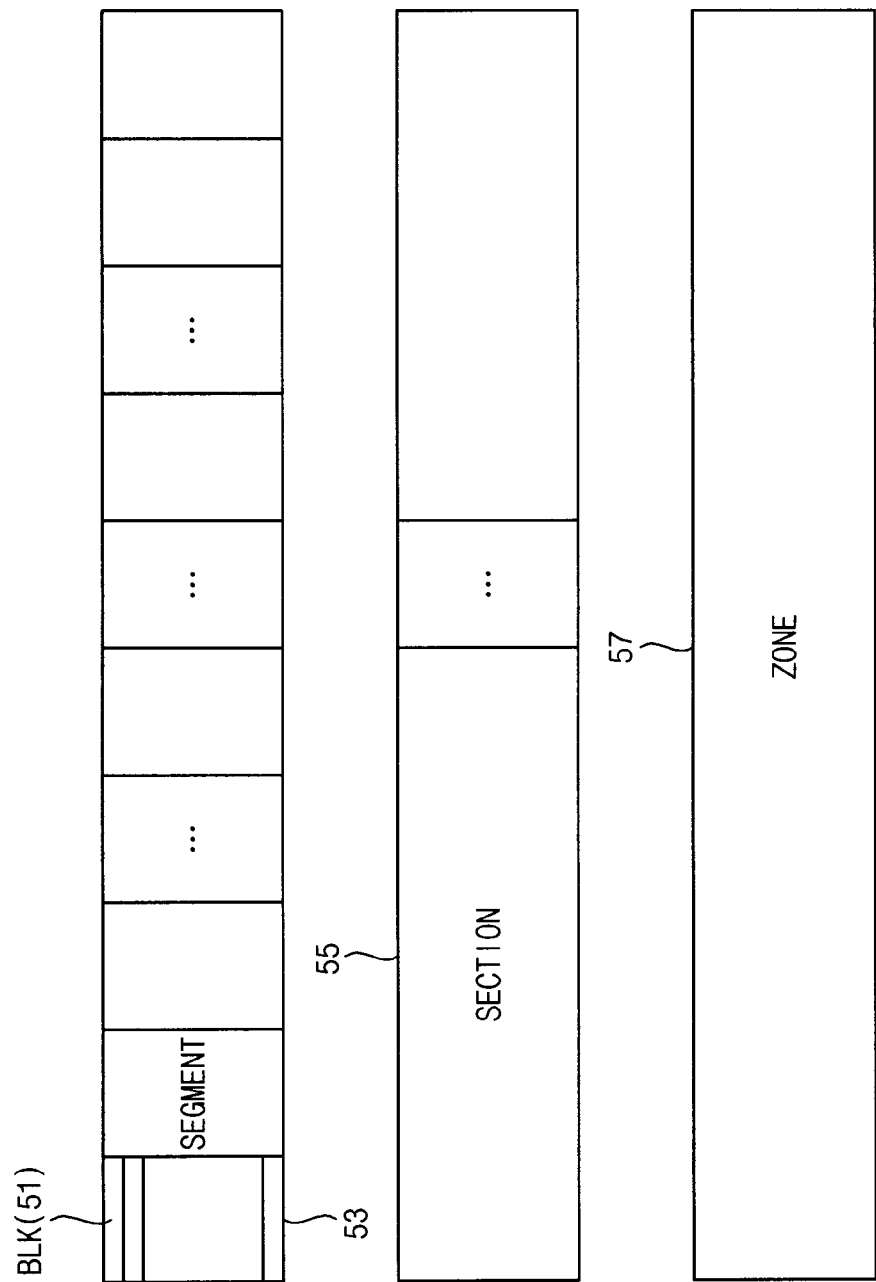
FIG. 6 is a block diagram for explaining an example of the nonvolatile storage in the storage device in FIG. 1 according to example embodiments.
Figure 7:
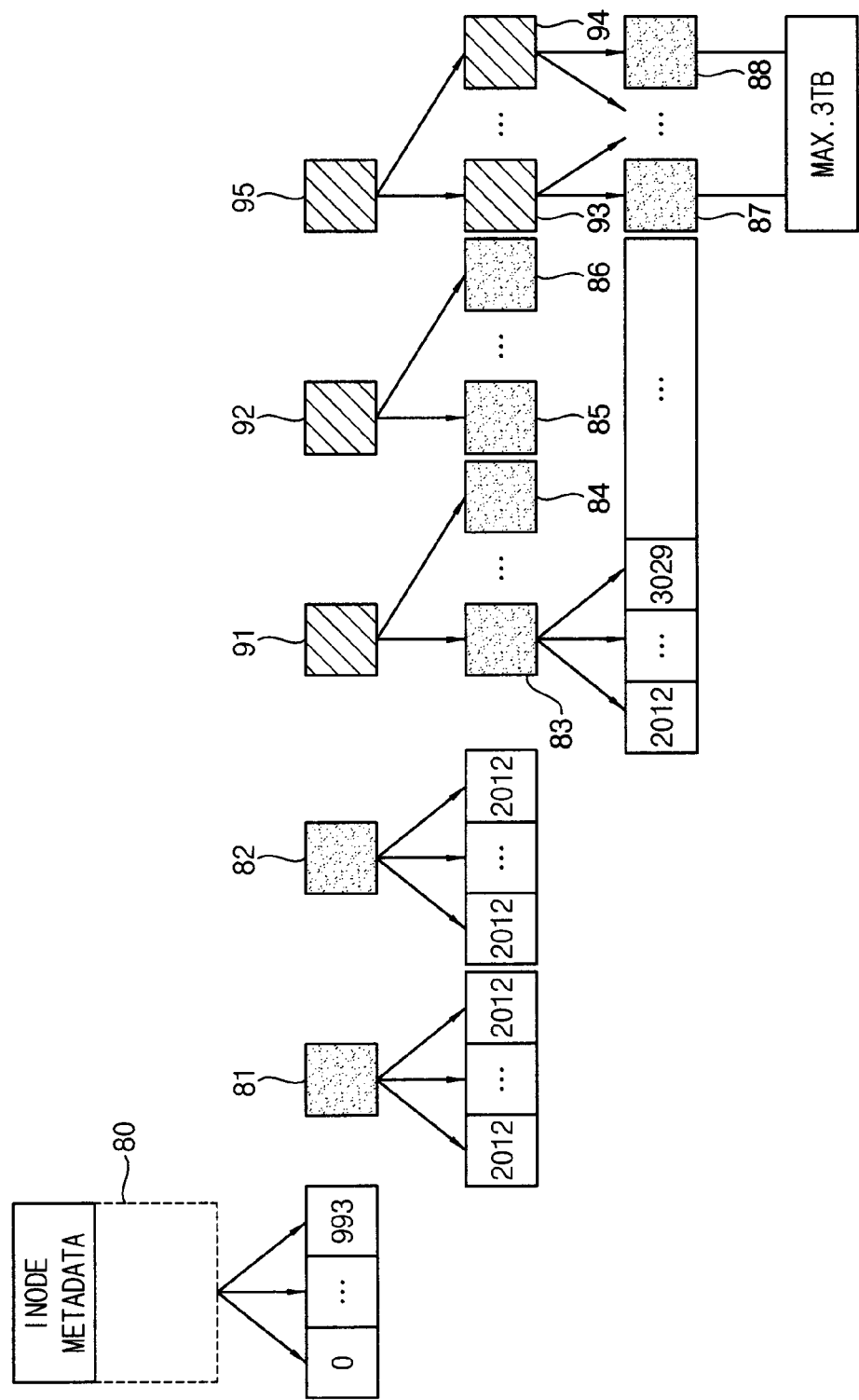
FIG. 7 is a diagram for illustrating structure of a file stored in the storage device in FIG. 1.
Figure 8:
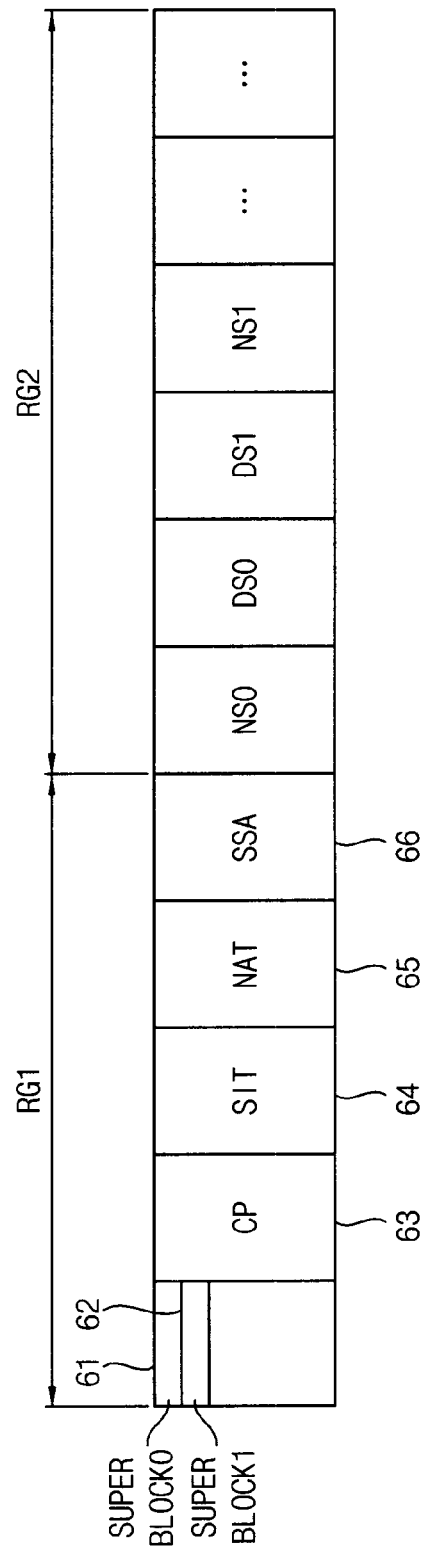
FIG. 8 is a block diagram for explaining an example of the nonvolatile storage in the storage device in FIG. 1 according to example embodiments.
Figures 9, 10:
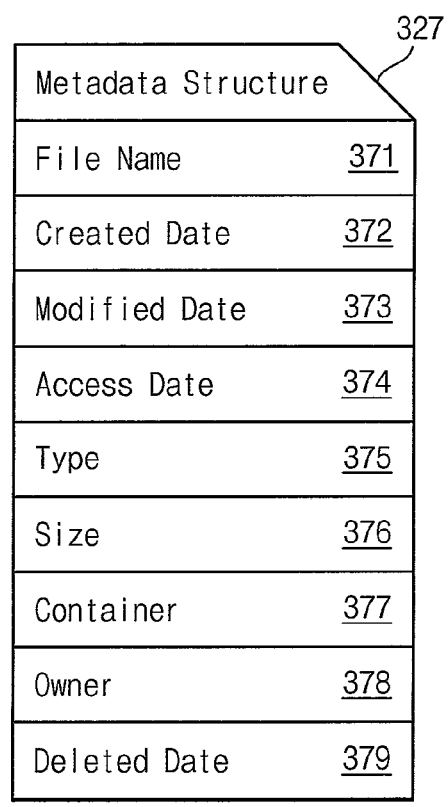
FIG. 9 is a diagram for explaining a node address table in FIG. 8 according to example embodiments.
FIG. 10 is an example of the metadata set generated by the file system in FIG. 3.

FIGS. 6, 7 and 8 are respectively block diagrams further illustrating in one example the nonvolatile storage 400 of the storage device 200 of FIG. 1 according to example embodiments. FIG. 7 is a diagram illustrating an exemplary structure of a file stored in the storage device 200 of FIG. 1, and FIG. 9 is a further diagram illustrating in one example the node address table of FIG. 8 according to example embodiments.

Referring to FIGS. 1, 6, 7, and 8, the nonvolatile storage 400 in the storage device 200 may be configured as illustrated in FIG. 6. That is, a segment (SEGMENT) 53 may include a plurality of blocks (BLK) 51, a section (SECTION) 55 includes a plurality of segments 53, and a zone (ZONE) 57 comprises a plurality of sections 55.

For example, the block 51 may be 4K byte in size, and the segment 53 may be 2M byte in size, since the segment 53 includes 512 blocks 51. Such a configuration may be determined during formatting of the storage device 200, but is not limited thereto.

A file stored in the storage device 200 may have an indexing structure as illustrated in FIG. 7. One file may comprise multiple units of data and multiple corresponding nodes. Data blocks 70 are regions that store data, and node blocks 80, 81 to 88, and 91 to 95 are regions that store nodes.

The node blocks 80, 81 to 88, and 91 to 95 may include direct node blocks 81 to 88, indirect node blocks 91 to 95, and an index node (inode) block 80. In FIG. 8, the direct node blocks 81 to 88 are indicated by shading and the indirect node blocks 91 to 95 are indicated by hatching lines.

The direct node blocks 81 to 88 may include data pointers directly pointing to the data blocks 70. The indirect node blocks 91 to 95 may include pointers to other node blocks (that is, lower node blocks) 83 to 88 which are not the data blocks 70. The indirect node blocks 91 to 95 may include, for example, first indirect node blocks 91 to 94 and a second indirect node block 95. The first indirect node blocks 91 to 94 include first node pointers to the direct node blocks 83 to 88, and second indirect node block 95 includes second node pointers to the first indirect node blocks 93 and 94.

The inode block 80 may include at least one data pointers of the first node pointers to the direct node blocks 81 and 82, second node pointers to the first indirect node blocks 91 and 92, and a third node pointer to the second indirect node block 95. One file may have a maximum size of (e.g.) 3 terabytes, and this large-capacity file may have the following index structure. For example, 994 data pointers are provided in the inode block 80, and the 994 data pointers may point to 994 data blocks 70. Two first node pointers are provided, and each of the two first node pointers may indicate two direct node blocks 81 and 82. Two second code pointers are provided, and the two second node pointers may indicate two first indirect node blocks 91 and 92. One third node pointer is provided, and may indicate the second indirect node blocks 95.

Inode pages may also include inode metadata by files.

As shown in FIG. 8, the storage device 200 may be divided into a first region RG1 and a second region RG2. The file system 132 typically divides the storage device 200 into the first region RG1 and the second region RG2 during formatting, but is not limited thereto. The first region RG1 is a region intended to store various kinds of system level information, and may include (e.g.) information on a number of files currently allocated, a number of valid pages, and associated locations. The second region RG2 is a region intended to store various kinds of directory information for user data and related file information.

The first region RG1 may include superblocks 61 and 62, a checkpoint area (CP) 63, a segment information table (SIT) 64, a node address table (NAT) 65, and a segment summary area (SSA) 66. The superblocks 61 and 62 may store default information of file system 132, such as the size of the block 51, the number of the blocks 51, status flags (clean, stable, active, logging, and unknown). As illustrated, two superblocks 61 and 62 may be provided, and the same content may be stored in the respective superblocks. Accordingly, where a defect occurs in one of the two superblocks, the other may be used as a backup.

Checkpoints are stored in the checkpoint area 63. A checkpoint corresponds to a logical breakpoint of the storage system 10, and it stores a state of the system up to the breakpoint. Accordingly, if a system fault or sudden power off occurs during the operation of the storage system 10, the file system 132 may restore data using the checkpoint(s). Such a checkpoint may be generated (e.g.) periodically, in response to a user command and/or at system shutdown, but is not limited thereto.

As illustrated in FIG. 9, the node address table 65 comprises a plurality of node identifiers (NODE ID) corresponding to respective nodes and a plurality of physical addresses corresponding to the plurality of node identifiers.

For example, the node block corresponding to node identifier N0 may correspond to a physical address "a", the node block corresponding to node identifier N1 may correspond to a physical address "b", and the node block corresponding to the node identifier N2 may correspond to a physical address "c". All nodes (including inode, direct nodes, and indirect nodes) may have inherent node identifiers. In other words, all nodes may be allocated inherent node identifiers from the node address table 65. Hence, the node address table 65 stores the node identifier of the inode, the node identifiers of the direct nodes, and the node identifiers of the indirect nodes. The respective physical addresses corresponding to the respective node identifiers may be readily updated.

The segment information table 64 includes a number of valid pages for each segment and bit maps for the plurality of pages. The bit map indicates whether each page is valid, e.g., using a "0" or "1". The segment information table 64 may be used during various housekeeping tasks (e.g., garbage collection). The use of the bitmap may reduce unnecessary read requests when a housekeeping task is performed, and may also be used to allocate blocks during adaptive data logging.

The segment summary area 66 is an area that stores summary information for each segment of the second region RG2. Specifically, the segment summary area 66 stores information for each node of the second region RG2. The segment summary area 66 may be used during housekeeping tasks.

The node blocks 80, 81 to 88, and 91 to 95 have a node identifier list or address to confirm positions of the data blocks 70 or lower node blocks (e.g., direct node blocks). In contrast, the segment summary area 66 provides indices, whereby the data blocks 70 or lower node blocks 80, 81 to 88, and 91 to 95 can confirm the location (or positions) of the upper node blocks 80, 81 to 88, and 91 to 95. The segment summary area 66 comprises a plurality of segment summary blocks, where each segment summary block has information on one segment located in the second region RG2. Further, the segment summary block includes multiple units of summary information, and one unit of summary information corresponds to one data block or one node block.

The second region RG2 further includes data segments DS0 and DS1 and node segments NS0 and NS1, which are separate from each other. The data may be stored in the data segments DS0 and DS1, and the plurality of nodes may be stored in the node segments NS0 and NS1. Where the data and the nodes are separated in different areas, the segments may be effectively managed, and the data may be retrieved more effectively over a shorter time interval.

The second region RG2 may be a region that is written by a sequential access method, and the first region RG1 may be a region that is written by a random access method.

In addition, the second region RG1 may include data blocks and the first region RG1 may include an inode list.

FIG. 10 is a conceptual diagram illustrating one possible example of a metadata structure that may be generated by the file system of FIG. 3.

Referring to FIG. 10, the metadata set 327 may include various data fields, such as; a file name 371, a created date 372, a last modified date 373, a last accessed date 374, a file type 375 (e.g., executable, document, text file, or others), a file size 376, a container 377 that stores the file, an owner 378 of file and deleted date 379. Here, the term date is used to denote a calendar date and/or time.

Figure 11A:
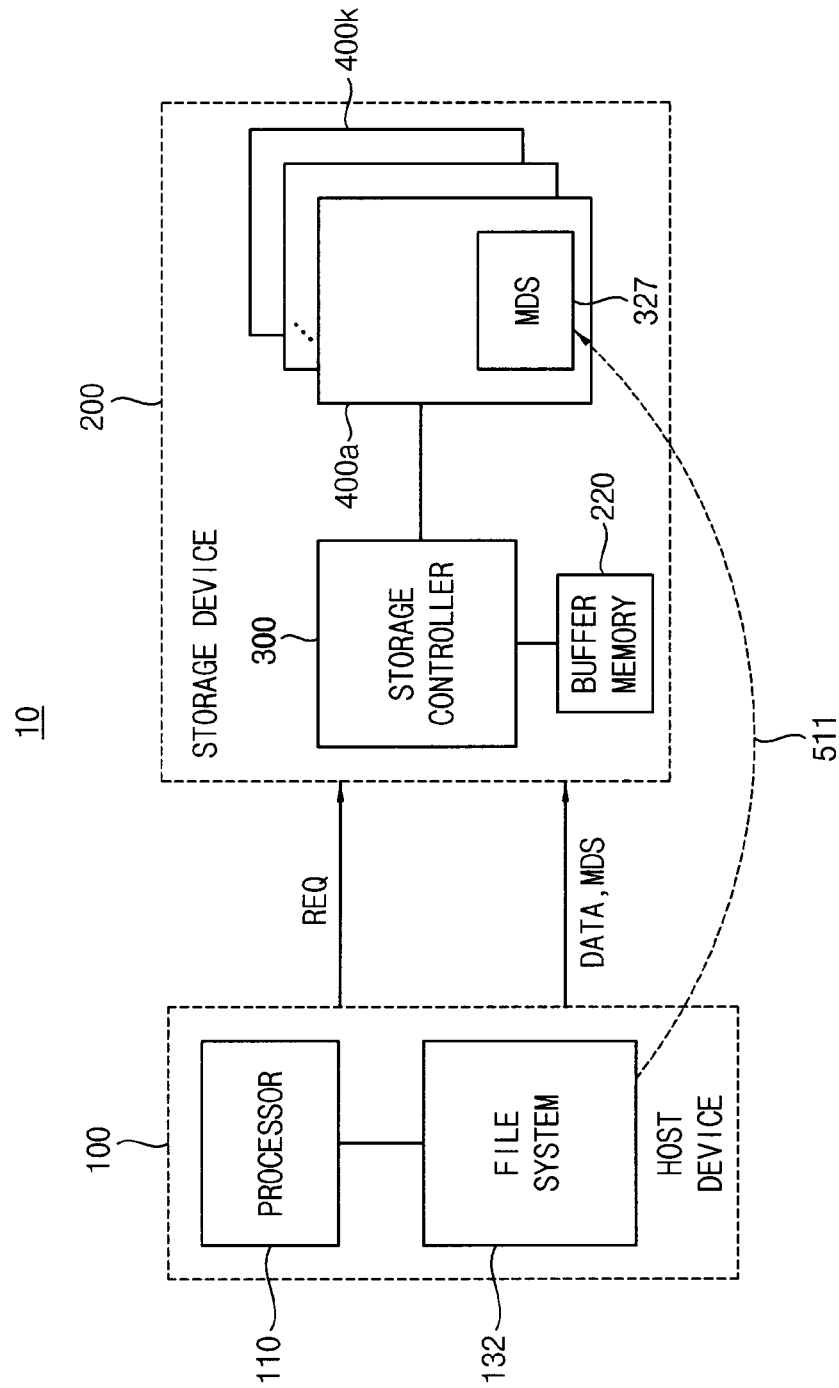
FIGS. 11A through 11C illustrate operations of the storage system of FIG. 1 according to some example embodiments.
Figure 11B:
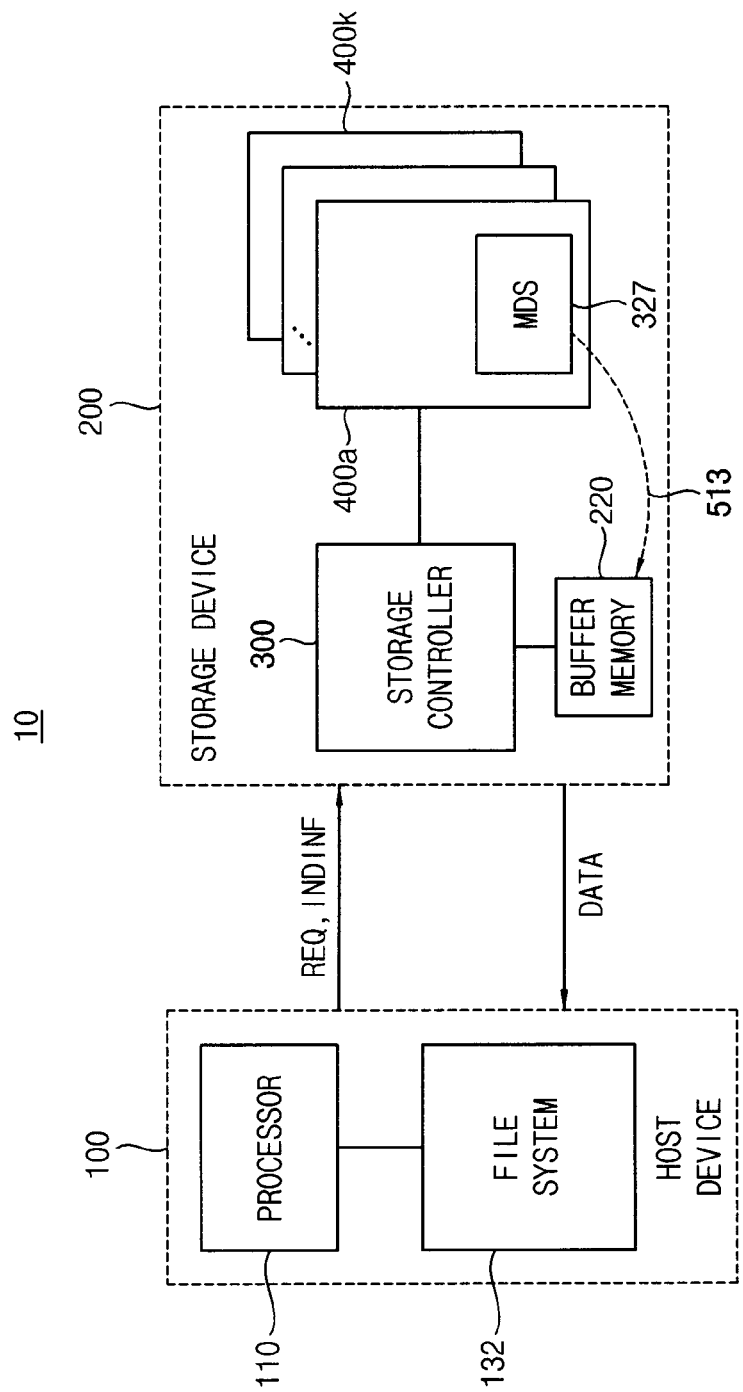
Figure 11C:
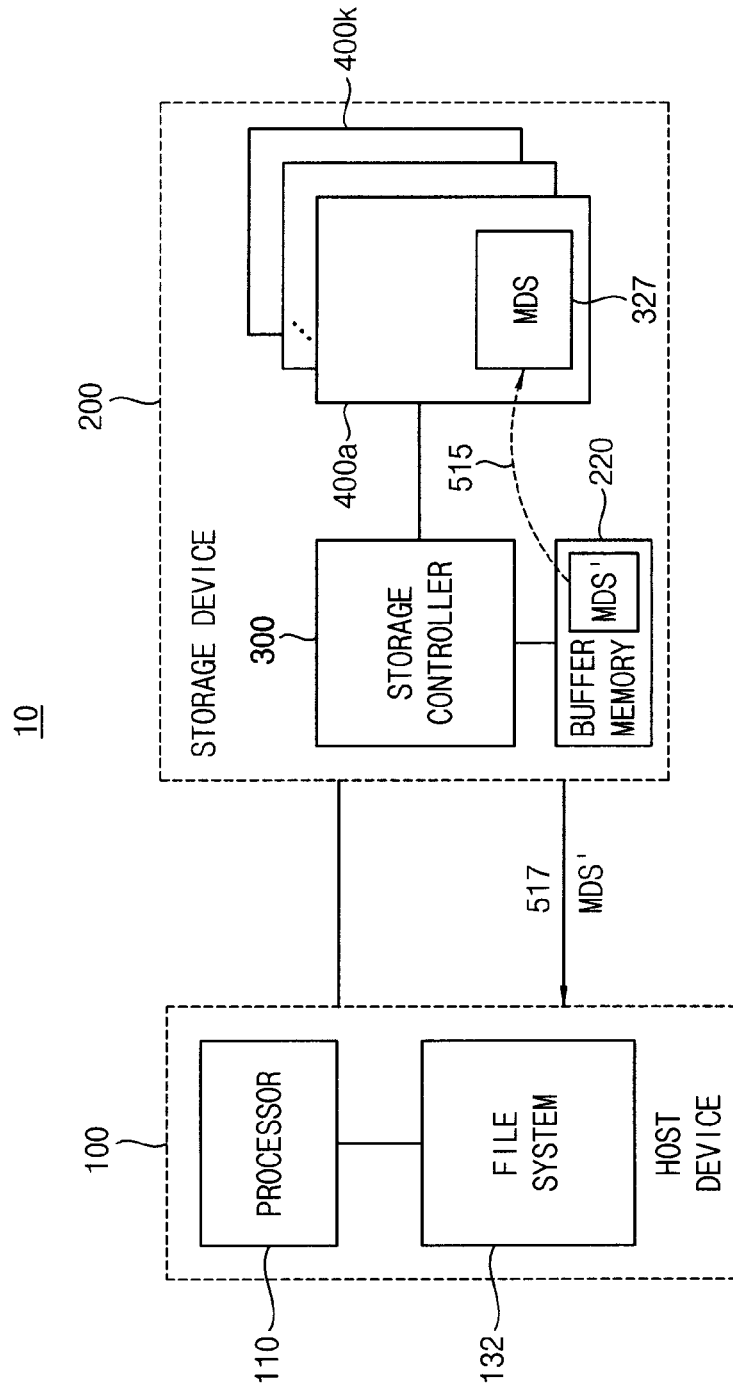

FIGS. 11A, 11B and 11C are block diagrams illustrating one possible approach to the operation of the storage system of FIG. 1 according to some example embodiments.

FIG. 11A illustrates an example in which a write operation is performed in response to a write request received from the host device 100. Thus, the host device 100 may provide the storage device 200 with a write request REQ, user data DATA and metadata 327 generated by the file system 132. The storage device 200 than stores the user data in the second region, and the metadata 327 in the first region of the nonvolatile memory device 200*a* (511).

FIG. 11B illustrates an example in which a read operation is performed in response to a read request for user data received from the host device 100. Thus, the host device 100 provides the storage device 200 with a read request REQ and address information INDINF for an inode to store related metadata associated with the user data.

The storage controller 300 loads the metadata 327 to the buffer memory 220 from the first region of the nonvolatile memory device 200*a* in response to the read request REQ and the address information INDINF of the inode (513), searches physical addresses of physical pages in which target data corresponding to the user data (or a portion of the user data) is stored as indicated by the metadata set 327 loaded to the buffer memory 220, accesses the physical addresses, and provides the host device 100 with the target data corresponding to the user data.

In this manner, the host device 100 may reduce I/O overhead between the host device 100 and the storage device 200 by providing the storage device 200 with the address information INDINF of the inode that stores metadata associated with the requested user data instead of by providing the storage device 200 with logical address(es) associated with the target data.

FIG. 11C illustrates an example in which the storage device 200 of in FIG. 1 updates the metadata. Thus, when the storage controller 300 wishes to update the metadata 327 loaded to the buffer memory 220, the storage controller 300 may first update the metadata in the buffer memory 220 and then flush the updated metadata MDS' to the nonvolatile memory device 200*a* periodically or otherwise (515).

In addition, the storage controller 300 may transmit the updated metadata set MDS' to the host device 100 in order to maintain consistency of the metadata (517). For example, the storage controller 300 may transmit the updated metadata MDS' to the host device 100 during idle time for the host device 100 and the storage device 200.

Figure 12:
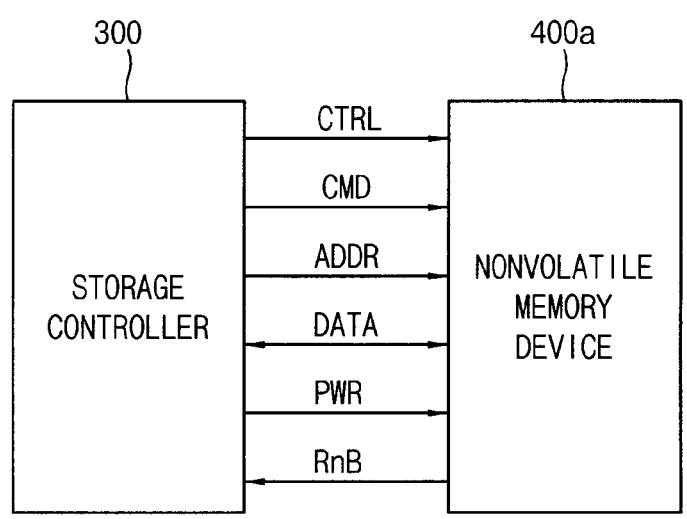
FIG. 12 is a block diagram illustrating a connection relationship between the storage controller and one nonvolatile memory device in the storage device of FIG. 1.

FIG. 12 is a block diagram illustrating one possible connection relationship between the storage controller 300 and a nonvolatile memory device 4000*a* in the storage device 10 of FIG. 1.

Referring to FIG. 12, the nonvolatile memory device 400*a* may perform an erase operation, a program operation, and/or a write operation under control of the storage controller 300. The nonvolatile memory device 400*a* may receive a command CMD, an address ADDR, and user data DATA through various I/O lines from the storage controller 300 for performing such operation(s).

In addition, the nonvolatile memory device 400*a* may receive a control signal CTRL through a control line and a power signal PWR through a power line from the storage controller 300. In addition, the nonvolatile memory device 400*a* may provide a status signal RnB to the storage controller 300 through the control line.

Figure 13:
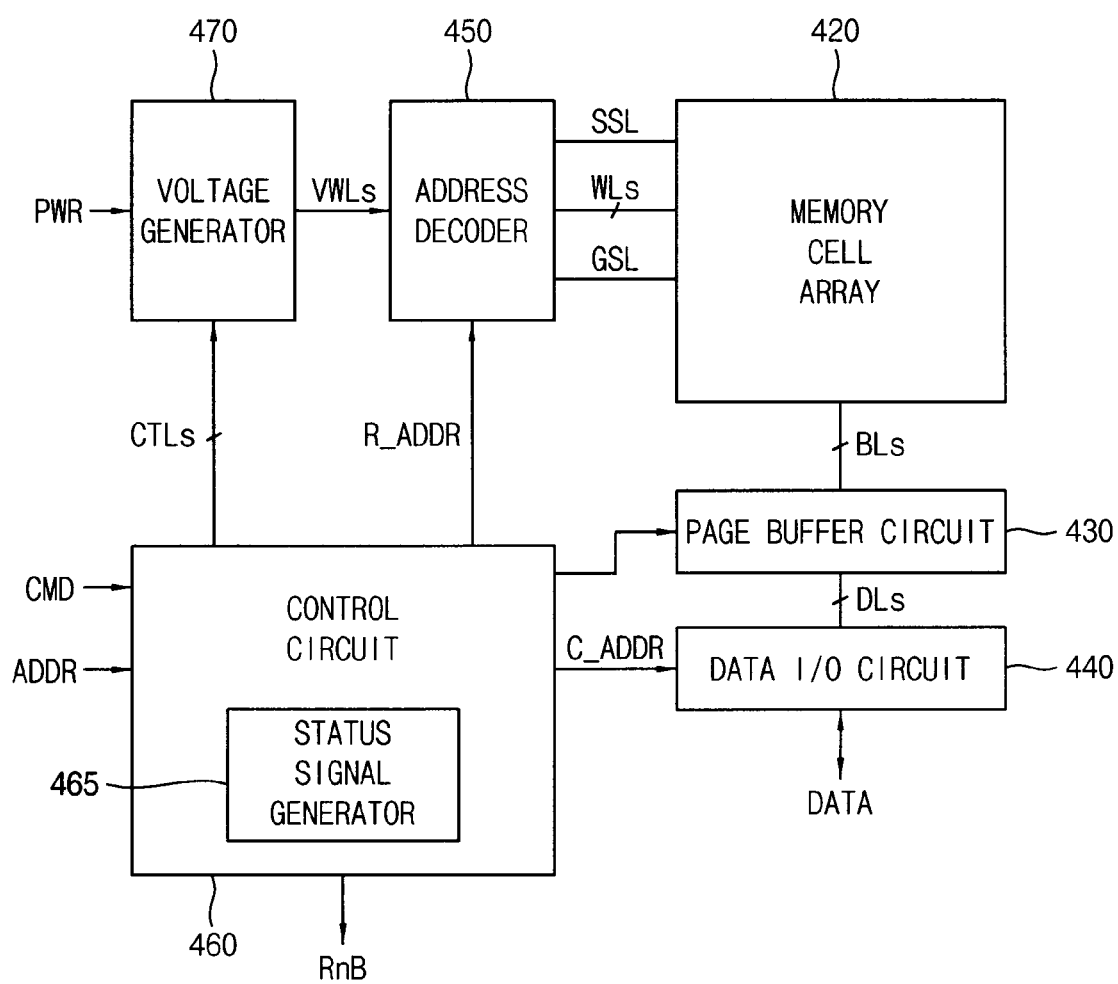
FIG. 13 is a block diagram illustrating the nonvolatile memory device in FIG. 12 according to some example embodiments.

FIG. 13 is a block diagram further illustrating the nonvolatile memory device 400*a* of FIG. 12 according to some example embodiments.

Referring to FIG. 13, the nonvolatile memory device 400*a* includes a memory cell array 420, an address decoder 450, a page buffer circuit 430, a data I/O circuit 440, a control circuit 460, and a voltage generator 470.

The memory cell array 420 may be coupled to the address decoder 450 through a string selection line SSL, a plurality of word-lines WLs, and a ground selection line GSL. In addition, the memory cell array 420 may be coupled to the page buffer circuit 430 through a plurality of bit-lines BLs.

The memory cell array 420 may include a plurality of memory cells coupled to the plurality of word-lines WLs and the plurality of bit-lines BLs.

In some example embodiments, the memory cell array 420 may be or include a three-dimensional memory cell array, which is formed on a substrate in a three-dimensional structure (e.g., a vertical structure). In this case, the memory cell array 420 may include vertical cell strings that are vertically oriented such that at least one memory cell is located over another memory cell.

In some example embodiments, the memory cell array 420 may be or include a two-dimensional memory cell array, which is formed on a substrate in a two-dimensional structure (or a horizontal structure).

Figure 14:
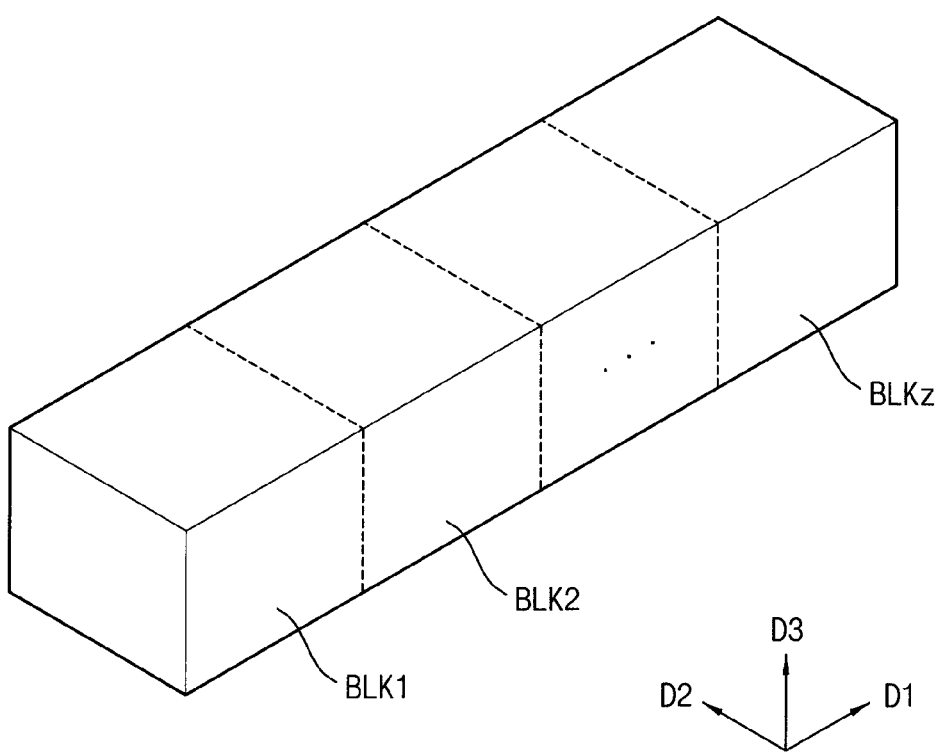
FIG. 14 is a block diagram illustrating the memory cell array in the nonvolatile memory device of FIG. 13.

FIG. 14 is a block diagram further illustrating the memory cell array 420 of the nonvolatile memory device 400*a* of FIG. 13.

Referring to FIG. 14, the memory cell array 420 may include a plurality of memory blocks BLK1 to BLKz. The memory blocks BLK1 to BLKz extend along first through third directions D1, D2 and D3. In some example embodiments, the memory blocks BLK1 to BLKz are selected by the address decoder 450 of FIG. 6. For example, the address decoder 450 may select a memory block BLK corresponding to a block address among the memory blocks BLK1 to BLKz.

Figure 15:
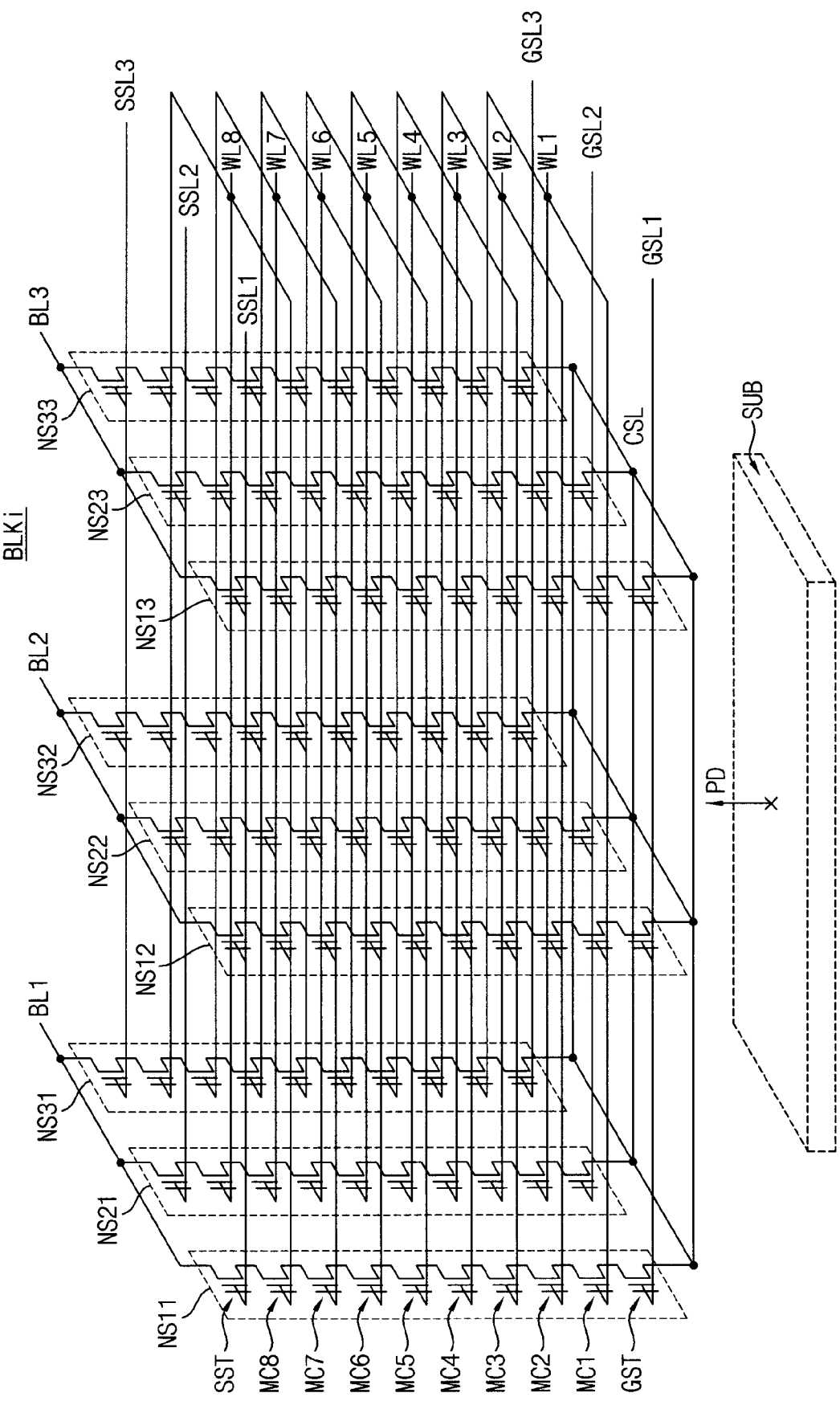
FIG. 15 is a circuit diagram illustrating one of the memory blocks of FIG. 14.

FIG. 15 is a circuit diagram further illustrating one of the memory blocks BLKi of FIG. 14.

The memory block BLKi of FIG. 15 may be formed on a substrate SUB in a three-dimensional structure (or a vertical structure). For example, a plurality of memory cell strings included in the memory block BLKi may be formed in a direction PD perpendicular to the substrate SUB.

Referring to FIG. 15, the memory block BLKi may include memory cell strings NS11 to NS33 coupled between bit-lines BL1, BL2 and BL3 and a common source line CSL. Each of the memory cell strings NS11 to NS33 may include a string selection transistor SST, a plurality of memory cells MC1 to MC8, and a ground selection transistor GST. In FIG. 15, each of the memory cell strings NS11 to NS33 is illustrated to include eight memory cells MC1 to MC8. However, the inventive concept is not limited thereto. In some example embodiments, each of the memory cell strings NS11 to NS33 may include any number of memory cells.

The string selection transistor SST may be connected to corresponding string selection lines SSL1 to SSL3. The plurality of memory cells MC1 to MC8 may be connected to corresponding word-lines WL1 to WL8, respectively. The ground selection transistor GST may be connected to corresponding ground selection lines GSL1 to GSL3. The string selection transistor SST may be connected to corresponding bit-lines BL1, BL2 and BL3, and the ground selection transistor GST may be connected to the common source line CSL.

Word-lines (e.g., WL1) having the same height may be commonly connected, and the ground selection lines GSL1 to GSL3 and the string selection lines SSL1 to SSL3 may be separated. In FIG. 15, the memory block BLKi is illustrated to be coupled to eight word-lines WL1 to WL8 and three bit-lines BL1 to BL3. However, the inventive concept is not limited thereto. In some example embodiments, the memory cell array 420 may be coupled to any number of word-lines and bit-lines.

Figure 16:
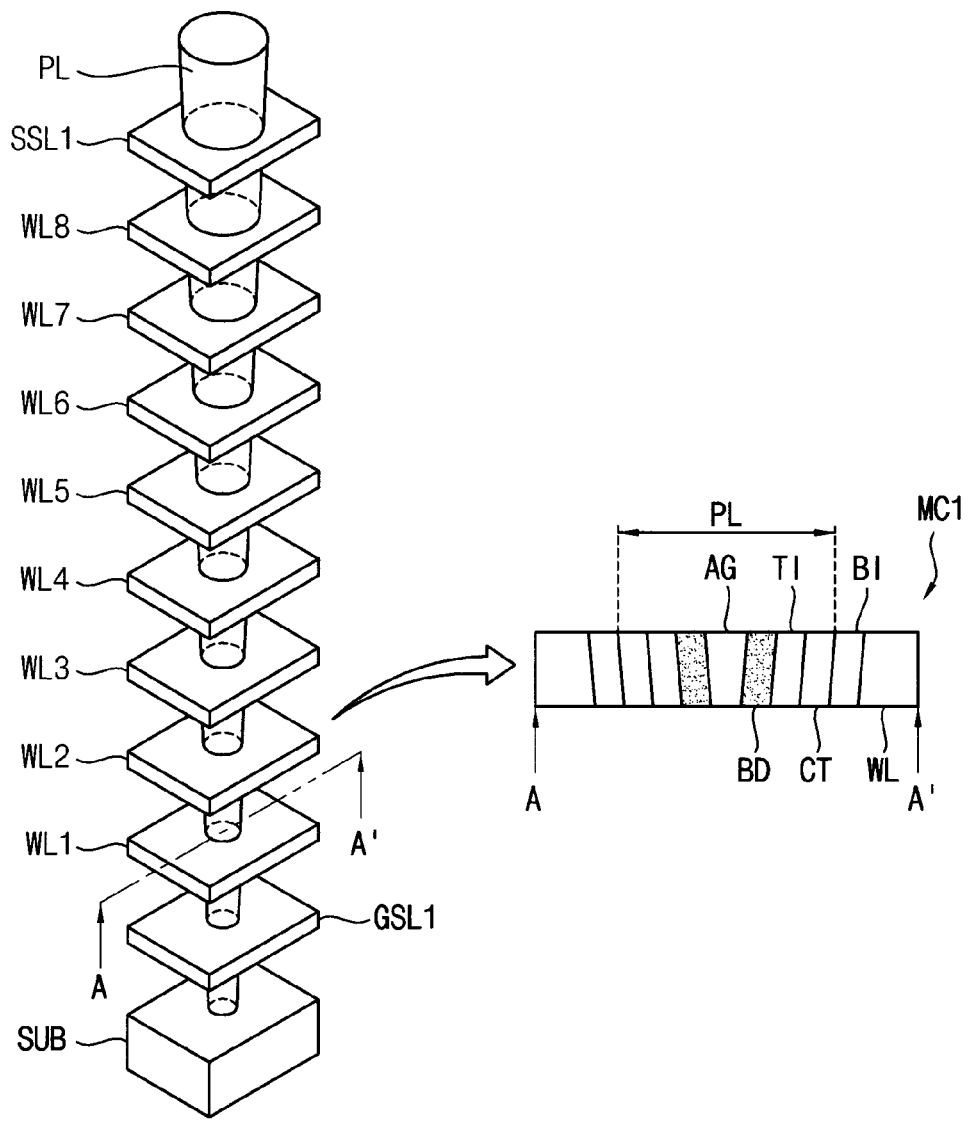
FIG. 16 illustrates an example of a structure of a cell string CS in the memory block of FIG. 15.

FIG. 16 further illustrates in one example a structure of a cell string CS in the memory block of FIG. 15.

Referring to FIGS. 15 and 16, a pillar PL is provided on the substrate SUB such that the pillar PL extends in a direction perpendicular to the substrate SUB to make contact with the substrate SUB. Each of the ground selection line GSL, the word lines WL1 to WL8, and the string selection lines SSL illustrated in FIG. 16 may be formed of a conductive material parallel with the substrate SUB, for example, a metallic material. The pillar PL may be in contact with the substrate SUB through the conductive materials forming the string selection lines SSL, the word lines WL1 to WL8, and the ground selection line GSL.

A cross-sectional view taken along a line A-A' is also illustrated in FIG. 16. In some example embodiments, a sectional view of a first memory cell MC1 corresponding to a first word line WL1 is illustrated. The pillar PL may include a cylindrical body BD. An air gap AG may be defined in the interior of the body BD.

The body BD may include P-type silicon and may be an area where a channel will be formed. The pillar PL may further include a cylindrical tunnel insulating layer TI surrounding the body BD and a cylindrical charge trap layer CT surrounding the tunnel insulating layer TI. A blocking insulating layer BI may be provided between the first word line WL and the pillar PL. The body BD, the tunnel insulating layer TI, the charge trap layer CT, the blocking insulating layer BI, and the first word line WL may constitute or be included in a charge trap type transistor that is formed in a direction perpendicular to the substrate SUB or to an upper surface of the substrate SUB. A string selection transistor SST, a ground selection transistor GST, and other memory cells may have the same structure as the first memory cell MC1.

Referring back to FIG. 13, the control circuit 460 may receive a command signal CMD and the address ADDR from the storage controller 300, and may control an erase loop, a program loop and/or a read operation of the nonvolatile memory device 411 in response to the command signal CMD and the address signal ADDR. The program loop may include a program operation and a program verification operation. The erase loop may include an erase operation and an erase verification operation.

For example, the control circuit 460 may generate control signals CTLs, which are used for controlling the voltage generator 470, in response to the command signal CMD, and generate a row address R_ADDR and a column address C_ADDR in response to the address signal ADDR. The control circuit 460 may provide the row address R_ADDR to the address decoder 450 and provide the column address C_ADDR to the data I/O circuit 440.

The address decoder 450 may be coupled to the memory cell array 420 through the string selection line SSL, the plurality of word-lines WLs, and the ground selection line GSL. During the program operation or the read operation, the address decoder 450 may determine one of the plurality of word-lines WLs as a first word-line (e.g., a selected word-line) and determine rest of the plurality of word-lines WLs except for the first word-line as unselected word-lines based on the row address R_ADDR.

The voltage generator 470 may generate word-line voltages VWLs, which are required for the operation of the nonvolatile memory device 411, in response to the control signals CTLs. The voltage generator 470 may receive a power PWR from the storage controller 300. The word-line voltages VWLs may be applied to the plurality of word-lines WLs through the address decoder 450.

For example, during the erase operation, the voltage generator 470 may apply an erase voltage to a well of the memory block and may apply a ground voltage to entire word-lines of the memory block. During the erase verification operation, the voltage generator 470 may apply an erase verification voltage to the entire word-lines of the memory block or sequentially apply the erase verification voltage to word-lines in a word-line basis.

For example, during the program operation, the voltage generator 470 may apply a program voltage to the first word-line and may apply a program pass voltage to the unselected word-lines. In addition, during the program verification operation, the voltage generator 470 may apply a program verification voltage to the first word-line and may apply a verification pass voltage to the unselected word-lines.

Furthermore, during the read operation, the voltage generator 470 may apply a read voltage to the first word-line and may apply a read pass voltage to the unselected word-lines.

The page buffer circuit 430 may be coupled to the memory cell array 420 through the plurality of bit-lines BLs. The page buffer circuit 430 may include a plurality of page buffers. In some example embodiments, one page buffer may be connected to one bit-line. In some example embodiments, one page buffer may be connected to two or more bit-lines.

The page buffer circuit 430 may temporarily store data to be programmed in a selected page or data read out from the selected page.

The data I/O circuit 440 may be coupled to the page buffer circuit 430 through data lines DLs. During the program operation, the data I/O circuit 440 may receive the data DATA from the storage controller 300 and provide the data DATA to the page buffer circuit 430 based on the column address C_ADDR received from the control circuit 460.

During the read operation, the data I/O circuit 440 may provide the data DATA, which are stored in the page buffer circuit 430, to the storage controller 300 based on the column address C_ADDR received from the control circuit 460.

In addition, the page buffer circuit 430 and the data I/O circuit 440 read data from a first area of the memory cell array 420 and write the read data to a second area of the memory cell array 420. For example, the page buffer circuit 430 and the data I/O circuit 440 may perform a copy-back operation. The control circuit 460 may control the page buffer circuit 430 and data I/O circuit 440.

The control circuit 460 may include a status signal generator 465 and the status signal generator 465 may generate the status signal RnB indicating whether each of the program operation, the erase operation and the read operation is completed or and/or is in progress.

Figure 17:
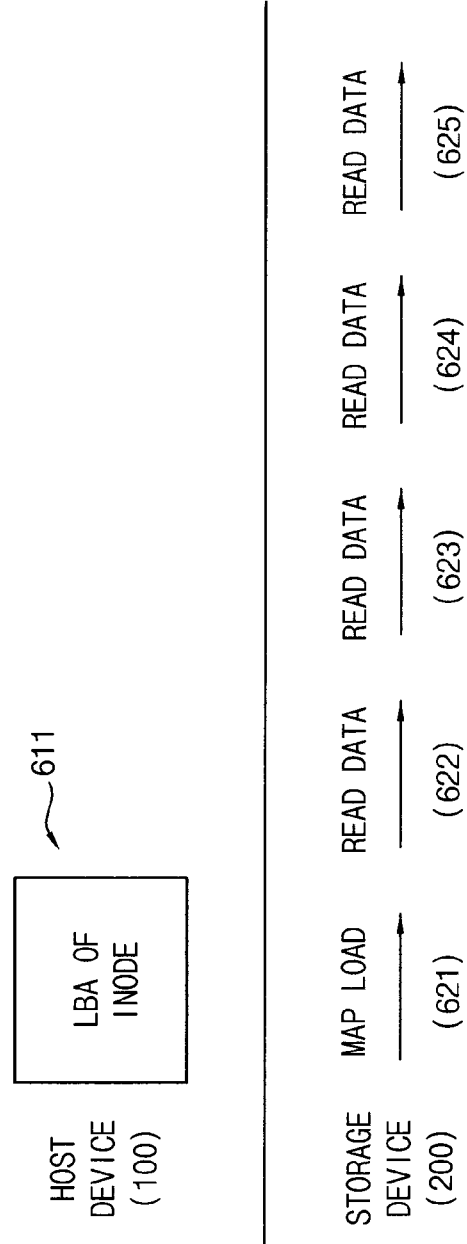
FIG. 17 illustrates that consecutive read operations are performed in response to one request in the storage system of FIG. 1 according to some example embodiments.

FIG. 17 conceptually illustrates a succession of consecutive read operations performed in response to request(s) in the storage system 10 of FIG. 1 according to some example embodiments.

Referring to FIG. 17, when logical addresses identifying target data are non-consecutive, the host device 100 may transmit a read request and address information logical block address (LBA) of the inode (INODE) to the storage device 200 (611). The storage device 200, in response to the read request and LBA of INODE, loads the metadata 327 (MAP LOAD, 621), and then reads target data from a sequence of non-consecutive physical pages in which the target data is stored consecutively by referring to the metadata 327 (622, 623, 624 and 625).

Figure 18:
FIG. 18 illustrates an example that the storage controller in the storage device in FIG. 1 updates the metadata set.

FIG. 18 illustrates an example in which the storage controller 300 of the storage device 10 of FIG. 1 updates the stored metadata.

Referring to FIG. 18, a first mapping table MTa stores current mapping information between consecutive logical pages LPN0, LPN1, LPN2 and LPN3 and first physical pages PPN0, PPN2, PPN4 and PPN6 having non-consecutive physical addresses. Here, the target data is currently assumed to be stored in the non-consecutive physical pages PPN0, PPN2, PPN4 and PPN6. In this case, the storage controller 300 may update the first mapping table MTa to create a second mapping table MTb which stores updated mapping information between the consecutive logical pages LPN0, LPN1, LPN2 and LPN3 and second physical pages PPN40, PPN41, PPN42 and PPN43 having consecutive physical addresses. Here, the first mapping table MTa and the second mapping table MTb may be different versions (e.g., a current or old version, and an updated or new version) of the a mapping table that may be a portion of a larger metadata set mapping physical addresses and logical addresses corresponding to the physical addresses in the nonvolatile storage 400.

Thus, the storage controller 300 may update the metadata associated with the target data, such that the target data will be stored in the second physical pages PPN40, PPN41, PPN42 and PPN43 having consecutive physical addresses and the second physical pages PPN40, PPN41, PPN42 and PPN43 correspond to the consecutive logical pages LPN0, LPN1, LPN2 and LPN3.

Figure 19:
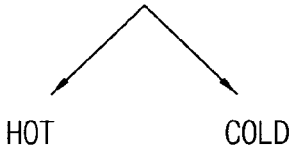
FIG. 19 illustrates that the storage controller of FIG. 4 determines attribute of the data by referring to the metadata set of FIG. 10.

FIG. 19 conceptually illustrates an approach in which the storage controller 300 of FIG. 4 may determine a data attribute by referring to the metadata structure of FIG. 10.

For example, the storage controller 300 may determine whether requested user data (i.e., target data) is hot data or cold data by referencing the access date 374 of the corresponding metadata 327. That is, the storage controller 300 may determine whether the target data is hot or cold by (e.g.) comparing the access date 374 with a reference date.

Figure 20:
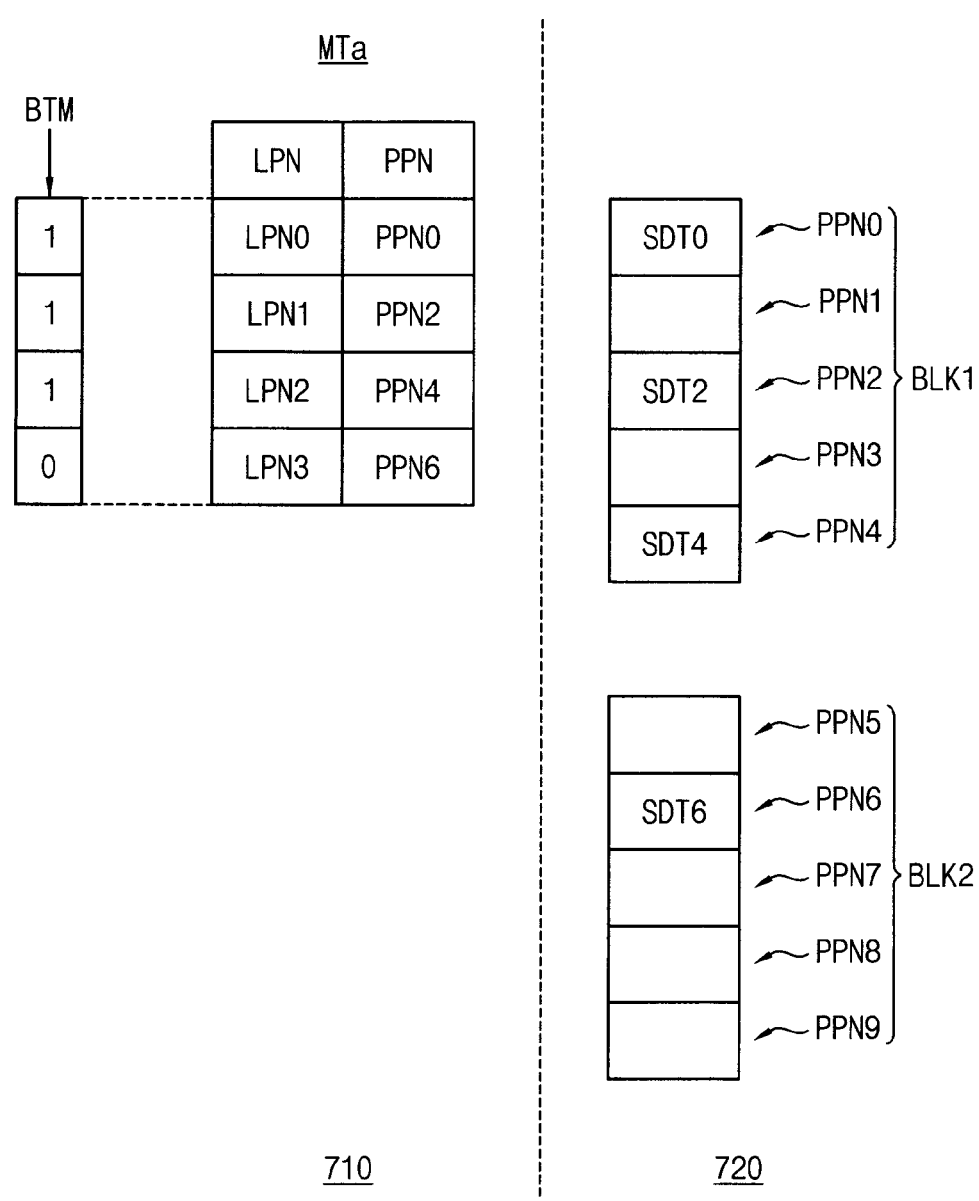
FIG. 20 illustrates an example of bitmap included in the metadata set.

FIG. 20 conceptually illustrates the use of a bitmap in relation to the metadata 327, a software layer of the storage controller 300 (710) and a physical layer of the nonvolatile storage 400 (720).

Referring to FIG. 20, the user data may include a plurality of sub data SDT0, SDT1, SDT2 and SDT3, a first block BLK includes physical pages PPN0~PPN4 a second block BLK2 includes physical pages PPN5~PPN9, and logical pages LPN0~LPN3 correspond to respective physical pages PPN0, PPN2, PPN4 and PPN6 according to information stored in the mapping table MTa. The sub data SDT0, SDT1 and SDT2 are stored in respective physical pages PPN0, PPN2 and PPN4 in the first block BLK1 and the sub data SDT3 is stored in the physical page PPN6 in the second block BLK2.

The bitmap BTM may be included as a portion of the metadata 327 and may indicate whether each of the logical pages LPN0~LPN3 corresponding to respective physical pages PPN0, PPN2, PPN4 and PPN6 storing the respective sub data SDT0, SDT1, SDT2 and SDT3 is valid as a logic level. For example, the bitmap BTM may use a logic 'high' to indicate that a corresponding page is valid, and a logic 'low' to indicate that a corresponding page is invalid. The storage controller 300 may delete the sub data SDT3 by referring to the bitmap BTM irrespective of the request from the host device 100. The storage controller 300 may delete at least a portion of the user data by referring to the bitmap BTM irrespective of the request of the host device 100.

In addition, the storage controller 300 may change a channel associated with storing the user data from a first channel to a second channel among the plurality of channels, irrespective of a request from the host device 100.

The storage controller 300 may move the metadata 327 from a first nonvolatile memory device to a second nonvolatile memory device among the plurality of nonvolatile memory devices based on program/erase cycle of a memory block storing the metadata set by using the FTL 305.

Figure 21:
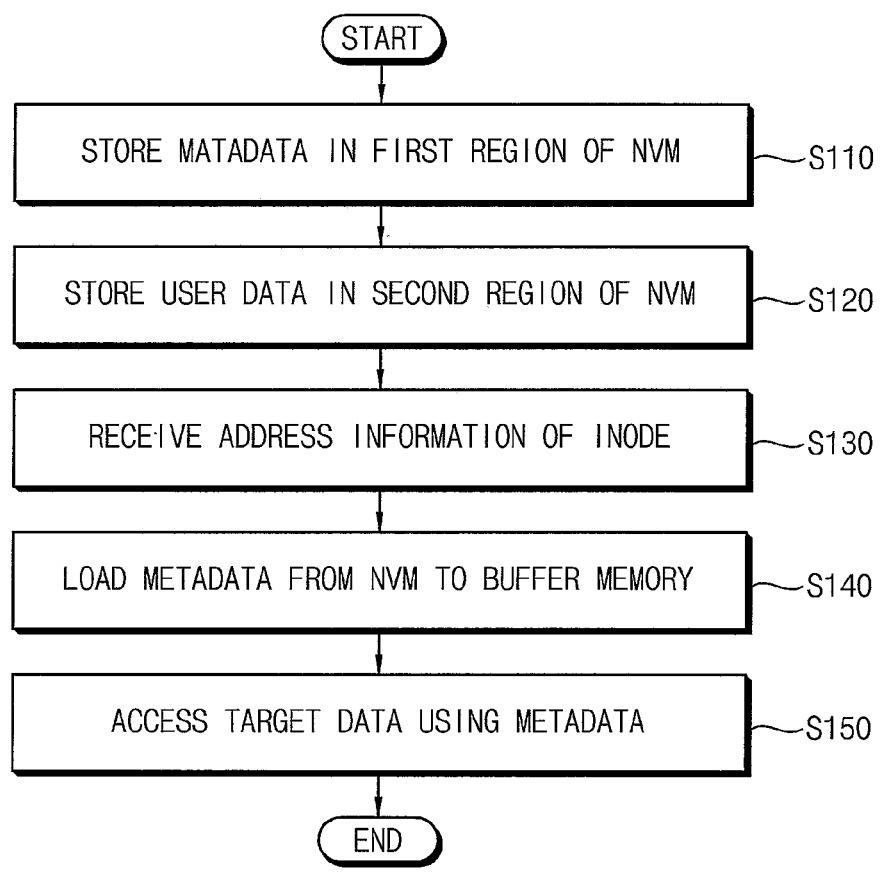
FIG. 21 is a flow chart illustrating a method of operating a storage device according to some example embodiments.

FIG. 21 is a flow chart summarizing a method of operating a storage device according to some example embodiments.

Referring to FIGS. 1 through 21, there is provided a method of operating the storage device 200 which includes the nonvolatile storage 400 (or nonvolatile memory NVM)—used to store user data (DATA) and metadata 327 associated with the management of the user data—as well as the storage controller 300 that controls the NVM.

According to the method, the storage controller 300 stores the metadata 327 provided by the host device 100 in the first region of the NVM (S110), and stores the user data provided by the host device 100 in the second region of the NVM (S120).

The storage controller 300 receives address information (INDINF) for the inode that stores metadata associated with identified target data from the host device 100 (S130).

The storage controller 300 loads the related metadata to the buffer memory 220 from the NVM in response to the address information INDINF for the inode (S140).

The storage controller 300 accesses the target data stored in the second region by referring to the metadata (S150) and transmits the target data to the host device 100.

According to example embodiments, the host device 100 may store metadata (e.g., a metadata set) associated with the management of user data in the nonvolatile storage 400 in the storage device 200, and the storage controller 300 may access the nonvolatile storage 400 using the metadata (e.g., location information) stored in the nonvolatile storage 400. Therefore, the storage device 200 may enhance performance by reducing I/O overhead between the host device 100 and the storage device 200.

Figure 22:
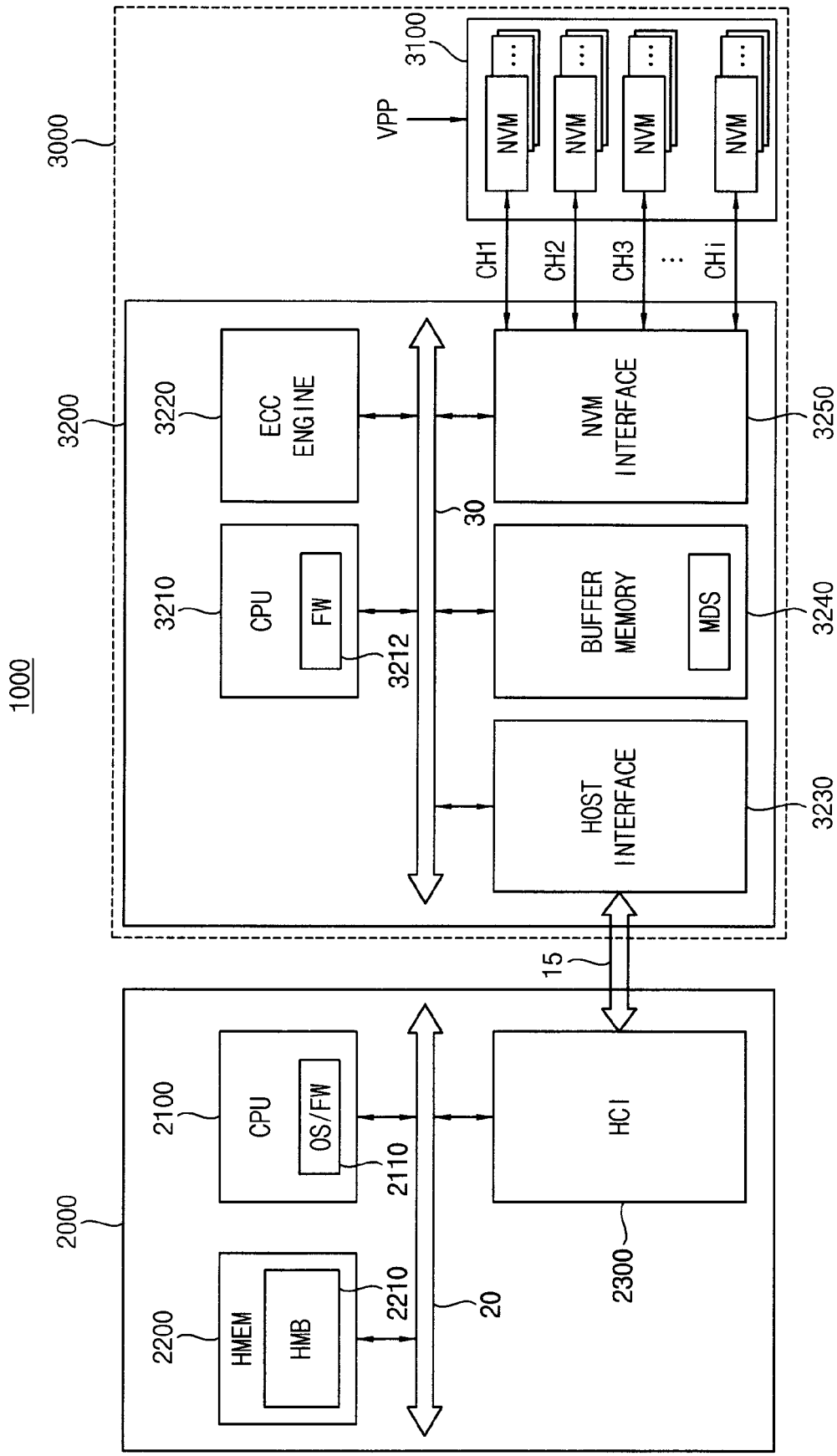
FIG. 22 is a block diagram illustrating a system including a storage device according to some example embodiments.

FIG. 22 is a block diagram illustrating a system including a storage device according to some example embodiments.

Referring to FIG. 22, a system 1000 includes a host device 2000 and a storage device 3000. For example, the host device 2000 may be an embedded multimedia card (eMMC), a solid state drive (SSD), or the like.

The host device 2000 may be configured to control data processing operations, such as data read operations and data write operations.

The host device 2000 may include a processor (CPU) 2100, a host memory (HMEM) 2200 and a host controller interface (HCI) 2300 connected through a bus 20. The host memory 2200 may store metadata set generated by a file system. Operating system (OS) and/or host firmware (FW) 2110 may be executed by the processor 2100. The processor 2100 may execute the operation system and the host firmware 2110 to perform these operations.

The host controller interface 2300 may interface with the storage device 3000. For example, the host controller interface 2300 is configured to issue the command CMD to the storage device 3000, receive the response RES from the command CMD from the storage device 3000, transmit write data to the storage device 3000, and receive read data from the storage device 3000.

The storage device 3000 may include multiple nonvolatile memory devices (NVM) 3100 and a storage controller 3200.

The nonvolatile memory devices 3100 may be optionally supplied with an external high voltage VPP. The storage controller 3200 may be connected to the nonvolatile memory devices 3100 through multiple channels CH1 to CHi. The storage controller 3200 may include one or more processors CPU 3210, an ECC engine 3220, a host interface 3230, a buffer memory 3240 and a nonvolatile memory interface 3250 connected through a bus 30.

The processor 3210 is configured to control overall operations of the storage controller 3200. For example, the processor 3210 may operate firmware 3212 including a FTL, and may include other firmware. The FTL may perform various functions, e.g., address mapping, read calibration, error correction, among other functions.

The ECC engine 3220 may perform ECC encoding on write data and may perform ECC decoding on read data.

The host interface 3230 may provide an interface with external devices such as the host device 2000. The nonvolatile memory interface 3250 may provide an interface with the nonvolatile memory devices 3100. The host device 2000 and the storage device 3000 may be connected through a bus 15.

The buffer memory 3240 may store metadata (MDS).

As described above, the host device 2000 may generate the metadata set MDS while storing user data in the nonvolatile memory devices 3100 and may store the metadata set MDS in the nonvolatile memory devices 3100. When the host device 2000 is to read at least a portion of the user data, the host device 2000 provides the storage controller 3200 with address information of an inode to store related metadata associated with the portion of the user data. The storage controller 3200 loads the metadata set MDS into the buffer memory 3240 based on the address the information of an inode and accesses the portion of the user data by referring to the metadata set MDS in the buffer memory 3240.

The storage controller 3200 may access the nonvolatile storage using logical information of the metadata set MDS in the buffer memory 3240 and thus reduce I/O overhead between the host device 2000 and the storage device 3000.

Figure 23:
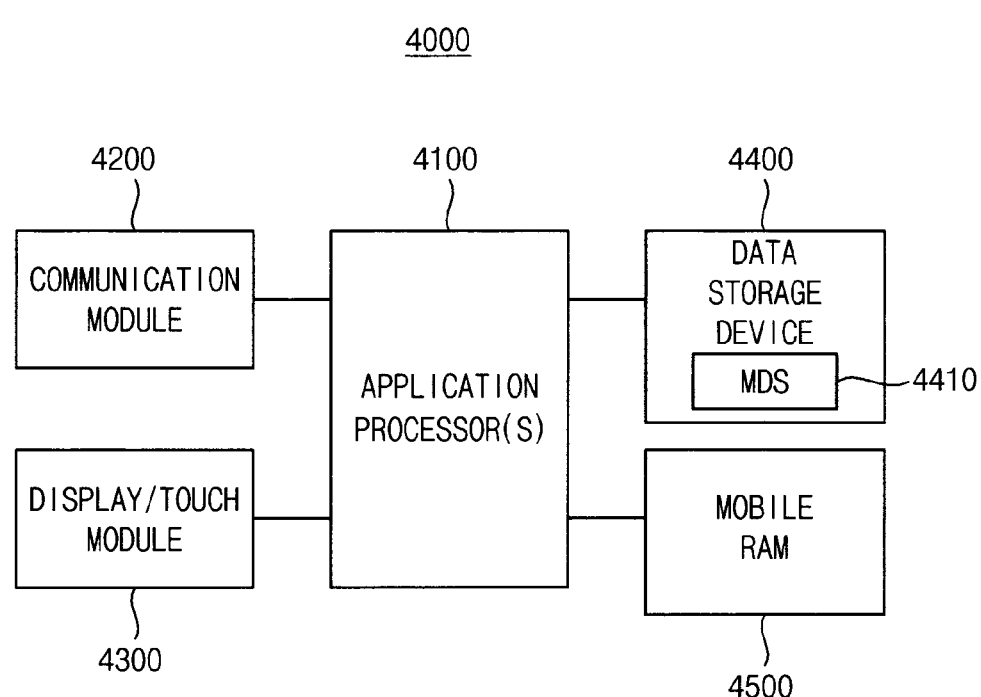
FIG. 23 is a block diagram illustrating a mobile device according to some example embodiments.

FIG. 23 is a block diagram illustrating a mobile device according to some example embodiments.

Referring to FIG. 23, a mobile device 4000 may include an application processor 4100 (including one or more application processors), a communication module 4200, a display/touch module 4300, a data storage device 4400, and a mobile RAM 4500.

The application processor 4100 controls operations of the mobile device 4000. The communication module 4200 is implemented to perform wireless or wire communications with an external device. The display/touch module 4300 is implemented to display data processed by the application processor 4100 and/or to receive data through a touch panel (not shown). The data storage device 4400 is implemented to store user data.

The data storage device 4400 may be an embedded multimedia card (eMMC), a solid state drive (SSD), a universal flash storage (UFS) device, or the like. The data storage device 4400 may store metadata set MDS associated with managing user data set and may access the user data using logical information of the metadata set MDS.

The mobile RAM 4500 temporarily stores data used for processing operations of the mobile device 4000. For example, the mobile RAM 4500 may be double data rate (DDR) synchronous DRAM (SDRAM), low power DDR (LPDDR) SDRAM, graphics DDR (GDDR) SDRAM, Rambus DRAM (RDRAM®), or the like.

As described above, the host device may store the metadata set associated with the management of user data in a nonvolatile storage, and the storage controller 300 may access the nonvolatile storage using location information of the metadata. Therefore, the storage device may enhance performance by reducing I/O overhead between the host device and the storage device.

The present disclosure may be applied to various electronic devices including a storage device. For example, the present disclosure may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing is illustrative of example embodiments and is not to be construed as limiting thereof. Although a few example embodiments have been described, those of ordinary skill in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A storage device comprising:
a nonvolatile memory including a first region and a second region;
a buffer memory; and
a controller coupled to the nonvolatile memory and the buffer memory and configured to receive a write request and first and second data associated with the write request from an external device, wherein the first data is user data and the second data is metadata describing attributes of the first data,
wherein the controller is further configured to:
store the first data in the first region of the nonvolatile memory and to store the second data in the second region of the nonvolatile memory,
determine whether the first data is hot data or cold data based on at least one of the attributes of the first data described by the second data; and
transmit the metadata to the external device during an idle time of the external device.

2. The storage device of claim 1, wherein the attributes of the first data described by the metadata include a file name, a created date, a last modified date, a last accessed date, a file type and a file size.

3. The storage device of claim 1, wherein the first data is user data that includes target data.

4. The storage device of claim 3, wherein the attributes of the first data described by the metadata include a last accessed date of the first data, and wherein the controller is configured to determine whether the target data is the hot data or the cold data based on the last accessed data described by the metadata.

5. The storage device of claim 3, wherein the attributes of the first data described by the metadata include a last accessed date of the first data, and wherein the controller is configured to determine whether the target data is the hot data or the cold data by comparing the last accessed date described by the metadata with a reference date.

6. The storage device of claim 3, wherein the controller is configured to load the metadata to the buffer memory and access the target data in the first region of the nonvolatile memory using the metadata in the buffer memory.

7. The storage device of claim 6, wherein the controller is configured to load the metadata to the buffer memory in response to a read request and address information for an index node associated with the metadata.

8. The storage device of claim 6, wherein when the target data is stored in first physical pages having non-consecutive physical addresses in the first region of the nonvolatile memory, the controller is configured to update the metadata such that the target data is stored in second physical pages having consecutive physical addresses in the first region of the nonvolatile memory.

9. The storage device of claim 8, wherein the controller is configured to transmit the updated metadata to the external device during an idle time of the storage device.

10. A storage device comprising:
a nonvolatile memory including a first region and a second region;
a buffer memory; and
a controller coupled to the nonvolatile memory and the buffer memory and configured to receive a write request and user data and metadata from an external device, and to store the user data in the first region of the nonvolatile memory and store the metadata in the second region of the nonvolatile memory, wherein:
the metadata describes attributes of the user data, and the user data includes target data,
when the target data has non-consecutive physical addresses in the first region of the nonvolatile memory, the controller is configured to update the metadata such that the target data is stored to have consecutive physical addresses in the first region of the nonvolatile memory,
the controller is configured to transmit the updated metadata to an external device during an idle time of the external device,
wherein the attributes of the user data described by the metadata include at least one of a file name, a created date, a last modified date, a last accessed date, a file type and a file size, and
the controller is further configured to determine whether the user data is hot data or cold data based on at least one of the attributes of the user data described by the metadata.

11. The storage device of claim 10, wherein the controller is configured to determine whether the user data is the hot data or the cold data based on the last accessed date described by the metadata.

12. The storage device of claim 10, wherein the controller is configured to determine whether the user data is the hot data or the cold data by comparing the last accessed date described by the metadata with a reference date.

13. The storage device of claim 10, wherein the controller is configured to load the metadata to the buffer memory and access the target data in the first region of the nonvolatile memory using the metadata in the buffer memory.

14. The storage device of claim 10, wherein the controller is configured to transmit the updated metadata to an external device during an idle time of the storage device.

15. A storage device comprising:
a nonvolatile memory including a first region and a second region;
a buffer memory; and
a controller coupled to the nonvolatile memory and the buffer memory and configured to receive a write request and first and second data associated with the write request from an external device, wherein the first data is user data and the second data is metadata describing attributes of the first data, wherein the controller is further configured to:

store the first data in the first region of the nonvolatile memory and store the second data in the second region of the nonvolatile memory, update the second data to reflect the first data to have consecutive physical addresses in the nonvolatile memory, transmit the updated second data to an external device during an idle time of the external device, and determine whether the first data is hot data or cold data based on at least one of the attributes of the first data described by the second data.

16. The storage device of claim 15, wherein:

the first data includes target data, when the target data has non-consecutive physical addresses in the first region of the nonvolatile memory, the controller is configured to update the metadata such that the target data is stored to have consecutive physical addresses in the first region of the nonvolatile memory.

17. The storage device of claim 16, wherein the controller is configured to load the metadata to the buffer memory and access the target data in the first region of the nonvolatile memory using the metadata in the buffer memory.

18. The storage device of claim 16, wherein the controller is configured to load the metadata to the buffer memory in response to a read request and address information for an index node associated with the metadata.

* * * * *